(12) United States Patent
Aoki

(10) Patent No.: US 7,764,881 B2
(45) Date of Patent: Jul. 27, 2010

(54) OPTICAL APPARATUS AND OPTICAL CROSS CONNECT APPARATUS

(75) Inventor: Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 11/320,960

(22) Filed: Dec. 30, 2005

(65) Prior Publication Data

US 2006/0210266 A1 Sep. 21, 2006

(30) Foreign Application Priority Data

Mar. 18, 2005 (JP) ............................. 2005-080154

(51) Int. Cl.
*H04B 10/00* (2006.01)
*H04Q 11/00* (2006.01)
*G02B 6/26* (2006.01)

(52) U.S. Cl. ..................... 398/2; 398/5; 398/6; 398/7; 398/45; 398/50; 398/51; 398/53; 398/54; 398/55; 398/56; 398/19

(58) Field of Classification Search ............ 398/45, 398/50, 51, 53–56, 2, 5, 6, 7
See application file for complete search history.

(56) References Cited

U.S. PATENT DOCUMENTS

| | | | | |
|---|---|---|---|---|
| 5,327,275 A | * | 7/1994 | Yamane et al. | 398/2 |
| 5,329,520 A | * | 7/1994 | Richardson | 370/225 |
| 5,457,556 A | * | 10/1995 | Shiragaki | 398/50 |
| 5,777,761 A | * | 7/1998 | Fee | 398/7 |
| 5,805,320 A | | 9/1998 | Kuroyanagi et al. | |
| 5,903,371 A | * | 5/1999 | Arecco et al. | 398/4 |
| 5,949,563 A | * | 9/1999 | Takada | 398/7 |
| 5,978,120 A | * | 11/1999 | Dumortier | 398/53 |
| 6,072,610 A | * | 6/2000 | Kuroyanagi et al. | 398/5 |

(Continued)

FOREIGN PATENT DOCUMENTS

JP HEI8-195972 7/1996

(Continued)

OTHER PUBLICATIONS

Japanese Office Action mailed May 26, 2009 for corresponding Japanese Patent Application No. 2005-080154.

(Continued)

*Primary Examiner*—Ken N Vanderpuye
*Assistant Examiner*—Danny W Leung
(74) *Attorney, Agent, or Firm*—Staas & Halsey LLP

(57) ABSTRACT

An optical apparatus is disclosed wherein increase of the number of wavelength selective switches provided for a standby system can be suppressed. The optical apparatus includes a plurality of upstream side optical devices and a plurality of downstream side optical devices configured such that a plurality of output ports to be set as output destinations of light from a plurality of input ports can be changed over for each wavelength. An upstream side standby switch connected at a plurality of inputs thereof individually to the input ports and can change over an output of light from the inputs for each wavelength. A downstream side standby switch is connected at an input thereof to the output of the upstream side standby switch and at a plurality of outputs thereof individually to the output ports and can output light from the input to the plural outputs thereof.

14 Claims, 20 Drawing Sheets

U.S. PATENT DOCUMENTS

| | | | |
|---|---|---|---|
| 6,101,010 A * | 8/2000 | Konishi | 398/14 |
| 6,307,653 B1 * | 10/2001 | Bala et al. | 398/2 |
| 6,320,684 B2 * | 11/2001 | Uehara | 398/7 |
| 6,323,974 B1 * | 11/2001 | Harris et al. | 398/2 |
| 6,404,940 B1 | 6/2002 | Tsuyama et al. | |
| 6,433,900 B1 * | 8/2002 | Kuroyanagi et al. | 398/19 |
| 6,570,685 B1 * | 5/2003 | Fujita et al. | 398/79 |
| 6,570,874 B1 * | 5/2003 | Nakai et al. | 370/387 |
| 6,626,590 B1 * | 9/2003 | Nagatsu et al. | 398/59 |
| 6,847,743 B2 * | 1/2005 | Yamaguchi | 385/11 |
| 6,903,324 B2 * | 6/2005 | Tomofuji et al. | 250/214 LA |
| 6,947,623 B2 * | 9/2005 | Ramaswami et al. | 385/16 |
| 6,950,215 B2 * | 9/2005 | Fant et al. | 359/16 |
| 6,983,108 B2 * | 1/2006 | Sugawara et al. | 398/45 |
| 6,999,677 B2 * | 2/2006 | Graves et al. | 398/5 |
| 7,027,732 B2 * | 4/2006 | Paiam et al. | 398/50 |
| 7,072,584 B1 * | 7/2006 | Lichtman et al. | 398/59 |
| 7,099,578 B1 * | 8/2006 | Gerstel | 398/5 |
| 7,103,274 B2 * | 9/2006 | Kunimatsu et al. | 398/2 |
| 7,155,084 B2 * | 12/2006 | Bortolini et al. | 385/24 |
| 7,171,119 B2 * | 1/2007 | Kuroyanagi et al. | 398/50 |
| 7,174,096 B2 * | 2/2007 | Berthold et al. | 398/5 |
| 7,200,329 B2 * | 4/2007 | Lee et al. | 398/50 |
| 7,212,739 B2 * | 5/2007 | Graves et al. | 398/5 |
| 7,231,107 B1 * | 6/2007 | Zhong et al. | 385/24 |
| 7,233,738 B2 * | 6/2007 | Kerfoot, III | 398/10 |
| 7,302,190 B2 * | 11/2007 | Goto et al. | 398/182 |
| 7,308,197 B1 * | 12/2007 | Zhong et al. | 398/48 |
| 7,310,479 B2 * | 12/2007 | Lee et al. | 398/45 |
| 7,352,966 B2 * | 4/2008 | Chaudhuri et al. | 398/5 |
| 7,389,043 B2 * | 6/2008 | Bernier et al. | 398/7 |
| 7,400,829 B2 * | 7/2008 | Watanabe | 398/5 |
| 7,400,832 B2 * | 7/2008 | Beacham et al. | 398/45 |
| 7,499,652 B2 * | 3/2009 | Zhong et al. | 398/83 |
| 7,505,686 B2 * | 3/2009 | Jennen | 398/49 |
| 7,515,828 B2 * | 4/2009 | Gumaste et al. | 398/83 |
| 7,532,817 B1 * | 5/2009 | Ko | 398/7 |
| 7,546,034 B2 * | 6/2009 | Mueller | 398/5 |
| 2002/0093712 A1 * | 7/2002 | Fukashiro et al. | 359/128 |
| 2002/0097462 A1 * | 7/2002 | Koyano et al. | 359/119 |
| 2003/0035172 A1 * | 2/2003 | Chen et al. | 359/127 |
| 2003/0170025 A1 * | 9/2003 | Bortolini et al. | 398/50 |
| 2003/0185566 A1 * | 10/2003 | Nishi et al. | 398/56 |
| 2004/0090236 A1 | 5/2004 | Kunimatsu et al. | |
| 2004/0136717 A1 * | 7/2004 | Zhang et al. | 398/85 |
| 2004/0161232 A1 * | 8/2004 | Kerfoot, III | 398/5 |
| 2006/0062514 A1 * | 3/2006 | Agranat | 385/17 |
| 2006/0093353 A1 * | 5/2006 | De Vos | 398/5 |
| 2006/0159454 A1 * | 7/2006 | Bjornstad | 398/51 |
| 2006/0210266 A1 * | 9/2006 | Aoki | 398/19 |
| 2008/0138068 A1 * | 6/2008 | Akiyama et al. | 398/50 |
| 2009/0028548 A1 * | 1/2009 | Tamura et al. | 398/2 |

FOREIGN PATENT DOCUMENTS

| | | |
|---|---|---|
| JP | HEI9-74577 | 3/1997 |
| JP | 10-210511 | 8/1998 |
| JP | HEI11-239100 | 8/1999 |
| JP | 2000-152292 | 5/2000 |
| JP | 2000-324522 | 11/2000 |
| JP | 2001-16625 | 1/2001 |
| JP | 2002-57625 | 2/2002 |
| JP | 2003-289557 | 10/2003 |
| WO | WO02/063890 | 8/2002 |

OTHER PUBLICATIONS

Notice of Rejection issued in Japanese Application No. 2005-080154 mailed Jan. 12, 2010.

* cited by examiner

FIG. 3

| WAVELENGTH | INPUT PORT #11 | INPUT PORT #12 | INPUT PORT #13 | INPUT PORT #14 |
|---|---|---|---|---|
| λ1 | OUTPUT PORT #21 | OUTPUT PORT #22 | OUTPUT PORT #23 | OUTPUT PORT #24 |
| λ2 | OUTPUT PORT #21 | OUTPUT PORT #22 | OUTPUT PORT #23 | OUTPUT PORT #24 |
| λ3 | OUTPUT PORT #22 | OUTPUT PORT #23 | OUTPUT PORT #24 | OUTPUT PORT #21 |
| λ4 | OUTPUT PORT #22 | OUTPUT PORT #23 | OUTPUT PORT #24 | OUTPUT PORT #21 |
| ⋮ | ⋮ | ⋮ | ⋮ | ⋮ |
| λn-1 | OUTPUT PORT #24 | OUTPUT PORT #23 | OUTPUT PORT #22 | OUTPUT PORT #21 |
| λn | OUTPUT PORT #24 | OUTPUT PORT #23 | OUTPUT PORT #22 | OUTPUT PORT #21 |

| WAVELENGTH | INPUT PORT #11 | INPUT PORT #12 | INPUT PORT #13 | INPUT PORT #14 |
|---|---|---|---|---|
| $\lambda 1$ | OUTPUT PORT #21 | OUTPUT PORT #22 | OUTPUT PORT #23 | OUTPUT PORT #24 |
| $\lambda 2$ | OUTPUT PORT #21 | OUTPUT PORT #22 | OUTPUT PORT #23 | OUTPUT PORT #24 |
| $\lambda 3$ | OUTPUT PORT #22 | OUTPUT PORT #23 | OUTPUT PORT #24 | OUTPUT PORT #21 |
| $\lambda 4$ | OUTPUT PORT #22 | OUTPUT PORT #23 | OUTPUT PORT #24 | OUTPUT PORT #21 |
| ⋮ | ⋮ | ⋮ | ⋮ | ⋮ |
| $\lambda n-1$ | OUTPUT PORT #24 | OUTPUT PORT #23 | OUTPUT PORT #22 | OUTPUT PORT #21 |
| $\lambda n$ | STANDBY OUTPUT PORT #24 | OUTPUT PORT #23 | OUTPUT PORT #22 | OUTPUT PORT #21 |

151

160A

160B

OPTICAL APPARATUS AND OPTICAL CROSS CONNECT APPARATUS

BACKGROUND OF THE INVENTION

1) Field of the Invention

The present invention relates to an optical apparatus and an optical cross connect apparatus.

2) Description of the Related Art

Optical communication systems nowadays use a wavelength division multiplexing (WDM) communication technique to assure a high transmission capacity. Further, commercialization of an optical cross connect node and a optical add/drop multiplexing node wherein switching is performed using an optical wavelength as a changeover unit in a hub node to which transmission path fibers are concentrated in a communication system or a line branching and inserting node in a ring network is proceeding.

Conventionally, such apparatus as described above have been formed such that, for example, as shown in FIG. 18, discrete parts such as a wavelength demultiplexer 901, an optical switch 902, a variable optical attenuator 903, a wavelength multiplexer 904 and so forth are mounted in individual units. An apparatus disclosed in Japanese Patent Laid-Open No. 2001-16625 (hereinafter referred to as Patent Document 1) is an example wherein discrete parts are mounted as units independent of each other as described above.

At present, in order to achieve miniaturization of an apparatus, also incorporation of a wavelength selective type optical switch (WSS: Wavelength Selective Switch) to which the functions described above are integrated is proceeding. FIG. 19 shows an optical cross connection apparatus 910 as an example which is configured using such a wavelength selective switch as just described. The optical cross connect apparatus 910 shown in FIG. 19 can change over the output routes of WDM input light inputted from n input ports #11 to #1n to n output ports #21 to #2n for each wavelengths and output the switched WDM light as WDM output light through the output ports #21 to #2n.

In the optical cross connect apparatus 910, a plural number of wavelength selective switches (1×n wavelength selective switches) 911 to 91n individually having one input and n outputs are provided on the input port side, the number corresponding to that of the input ports. Further, a plural number of n×1 wavelength selective switches 921 to 92n are provided on the output port side, the number corresponding to that of the output ports. Further, the optical cross connect apparatus 910 is formed such that outputs of the wavelength selective switches 911 to 91n are individually connected to inputs of the wavelength selective switches 921 to 92n.

In such an optical cross connect apparatus 910 as shown in FIG. 19, if a fault occurs with any of the discrete parts or the like in the wavelength selective switches 911 to 91n and 921 to 92n, then even if the parts other than the part with which the fault occurs operate normally, replacement of each of the wavelength selective switches 911 to 91n and 921 to 92n in which the faulty parties included must be performed.

Particularly, where, as seen in FIG. 20, a fault occurs, in the wavelength selective switches 911 to 91n and 921 to 92n, only with a switch for an optical signal having a particular wavelength within WDM light [for example, an optical signal having a wavelength λ1 within a WDM optical signal formed from wavelengths λ1 to λ8, refer to (a) of FIG. 20] or a fault occurs only with switching operation for a specific output route [refer to (b) of FIG. 20], even if switching operation for the other wavelengths or the other output routes is performed regularly, the wavelength selective switches which form one unit must be replaced entirely.

Accordingly, in such an optical cross connect apparatus 910 as shown in FIG. 19, a configuration wherein the apparatus 910 can be restored from a fault without waiting replacement of a unit upon occurrence of such a fault as described above is required as a subject. Further, a method wherein, when such replacement of a unit as described is performed, the influence on the other connections which operate normally is suppressed to the utmost is required as a subject.

SUMMARY OF THE INVENTION

It is an object of the present invention to provide an optical apparatus and an optical cross connect apparatus which have a redundant configuration while miniaturization of the apparatus is achieved.

It is another object of the present invention to provide an optical apparatus and an optical cross connect apparatus wherein any of wavelength division multiplexed signals handled by wavelength selective switches can be changed over in a unit of a wavelength so as to be handled by a standby system.

It is a further object of the present invention to provide an optical apparatus and an optical cross connect apparatus which eliminate, when a wavelength selective switch is to be replaced, an otherwise possible influence on the other connections which operate regularly.

It is a still further object of the present invention to provide an optical apparatus and an optical cross connect apparatus wherein restoration from a fault can be performed in an in-service condition.

In order to attain the objects described above, according to an aspect of the present invention, there is provided an optical apparatus comprising a plurality of input ports, a plurality of output ports, a plurality of upstream side optical devices provided corresponding to the input ports, a plurality of downstream side optical devices provided corresponding to the output ports, each of the plural upstream side optical devices having an input port connected to a corresponding one of the input ports and a plurality of outputs individually connected to the plural downstream side optical devices, each of the downstream side optical devices having a plurality of inputs individually connected to the outputs of the upstream side optical devices and an output connected to a corresponding one of the output ports, the upstream side optical devices and the down stream side optical devices being configured so as to be capable of changing over the output ports which are to be determined as output destinations of lights from the input ports for each of wavelengths, an upstream side standby switch having a plurality of inputs individually connected to the input ports and capable of changing over an output of the lights from the inputs for each of the wavelengths, and a downstream side standby switch having an input connected to the output of the upstream side standby switch and a plurality of outputs individually connected to the output ports and capable of outputting the light from the input to the outputs for each of the wavelengths.

In this instance, each of the upstream side optical devices may be formed as an upstream side optical switch capable of outputting the light from the input to the outputs for each of the wavelengths. Alternatively, each of the downstream side optical devices may be formed as a downstream side optical switch capable of selectively outputting the lights from the upstream side optical devices for each of the wavelengths.

The optical apparatus may be configured such that, when a fault occurs with the connection of a first upstream side optical device which is one of the upstream side optical devices to a first downstream side optical device which is one of the downstream side optical devices, the upstream side standby switch outputs the light inputted from the input port which corresponds to the first upstream side optical device and having a wavelength of the light which is to be outputted from the first upstream side optical device to the first downstream side optical device, and the downstream side standby switch outputs the light inputted thereto to the output port which corresponds to the first downstream side optical device.

The optical apparatus may be configured such that, when a fault occurs with the output of a first wavelength from a first upstream side optical device which is one of the upstream side optical devices, the upstream side standby switch outputs the light of the first wavelength inputted from the input port corresponding to the first upstream side optical device, and the downstream side standby switch outputs the light inputted thereto to the output port which corresponds to the downstream side optical device to which the light of the first wavelength is to be outputted from the first upstream side optical device.

The optical apparatus may be configured such that, where each of N and M represents an integer, each of the upstream side optical devices is formed from a 1×N wavelength selective switch and the number of the upstream side optical devices provided is M, and each of the downstream side optical devices is formed from an M×1 wavelength selective switch and the number of the downstream side optical devices provided is N.

As an alternative, the optical apparatus may be configured such that, wherein, where each of N and M represents an integer, each of the upstream side optical devices is formed from a 1×N wavelength selective switch and the number of the upstream side optical devices provided is M, and each of the downstream side optical devices is formed from an M×1 optical coupler and the number of the downstream side optical devices provided is N.

As another alternative, the optical apparatus may be configured such that, where each of N and M represents an integer, each of the upstream side optical devices is formed from a 1×N optical coupler and the number of the upstream side optical devices provided is M, and each of the upstream side optical devices is formed from an M×1 wavelength selective switch and the number of the downstream side optical devices provided is N.

The optical apparatus may further comprise a plurality of input port side optical couplers individually corresponding to the input ports each for branching a wavelength division multiplexed signal inputted from the corresponding input port into two signals and for outputting one of the branched signals to the upstream side optical device corresponding to the input port and outputting the other one of the branched signals to the upstream side standby switch, and a plurality of output port side optical couplers individually corresponding to the output ports each for multiplexing an output wavelength multiplexing optical signal outputted from the corresponding downstream side optical device and an optical signal from the downstream side standby switch.

The optical apparatus may further comprise a control section for performing changeover control between a path between the input ports and the output ports for each of the optical wavelengths set by the upstream side optical devices and the downstream optical devices and another path set by the upstream side standby switch and the downstream side standby switch.

In this instance, the control section may include a wavelength path table for storing, for each of wavelengths used to form the wavelength multiplexing optical signals, a relationship between the input ports and the output ports between which a wavelength path is to be set, and a setting changing section for changing a changeover setting between the upstream side optical devices and downstream side optical devices and between the upstream side standby switch and the downstream side standby switch based on contents of the wavelength path table.

Further, the optical apparatus may be configured such that the setting changing section leaves the other wavelength paths between the upstream side optical device and the downstream side optical device a wavelength path between which suffers from a fault without changing over the paths to the paths set by the upstream side standby switch and the downstream side standby switch.

According to another aspect of the present invention, there is an optical cross connect apparatus for optically cross connecting a plurality of input ports and a plurality of output ports, comprising a plurality of upstream side wavelength selective switches provided corresponding to the input ports for outputting input wavelength division multiplexed signals from the input ports to output routes changed over for each of wavelengths, a plurality of downstream side wavelength selective optical switches provided corresponding to the output ports for receiving, at inputs thereof, the optical signals outputted from the output routes of the upstream side wavelength selective switches, selecting the optical signals to be connected to the output ports from among the inputted optical signals for each of the wavelengths and outputting the selected wavelength division multiplexed signals, a plurality of tunable wavelength filters individually corresponding to the input ports for receiving the input wavelength division multiplexed signals from the input ports as inputs thereto and passing selected wavelength components of the input wavelength division multiplexed optical signals therethrough, a plurality of branching devices individually corresponding to the input ports for branching the optical signals of the wavelength components having passed through the tunable wavelength filters toward the output ports, and a plurality of continuity/discontinuity gates individually corresponding to the input ports for continuing or discontinuing the optical signals branched by the branching devices to the output ports.

With the optical apparatus and the optical cross connect apparatus, the following advantages can be achieved.

1. Since increase of the number of wavelength selective switches provided for the standby system can be suppressed, they have an advantage that miniaturization of the apparatus can be anticipated and power consumption can be reduced.

2. They have another advantage that, when any of the wavelength selective switches is to be replaced, the influence of the replacement upon the other connections which operate regularly is eliminated and wavelength path resources of the standby system can be utilized effectively.

3. They are advantageous also in that restoration from a fault can be performed in an in-service condition (while the apparatus are active).

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a table showing a wavelength path table in the first embodiment;

FIGS. 5 to 8 are views illustrating operation of the optical cross connect apparatus according to the first embodiment of the present invention;

DESCRIPTION OF THE PREFERRED EMBODIMENTS

In the following, preferred embodiments of the present invention are described with reference to the accompanying drawings.

It is to be noted that not only the objects of the present invention described hereinabove but also other technical subjects, means for solving the technical subjects and operation and advantages of the means will become apparent from the following disclosure of the preferred embodiments of the present invention.

A1. First Embodiment

A1-1. Configuration

Figure 1:
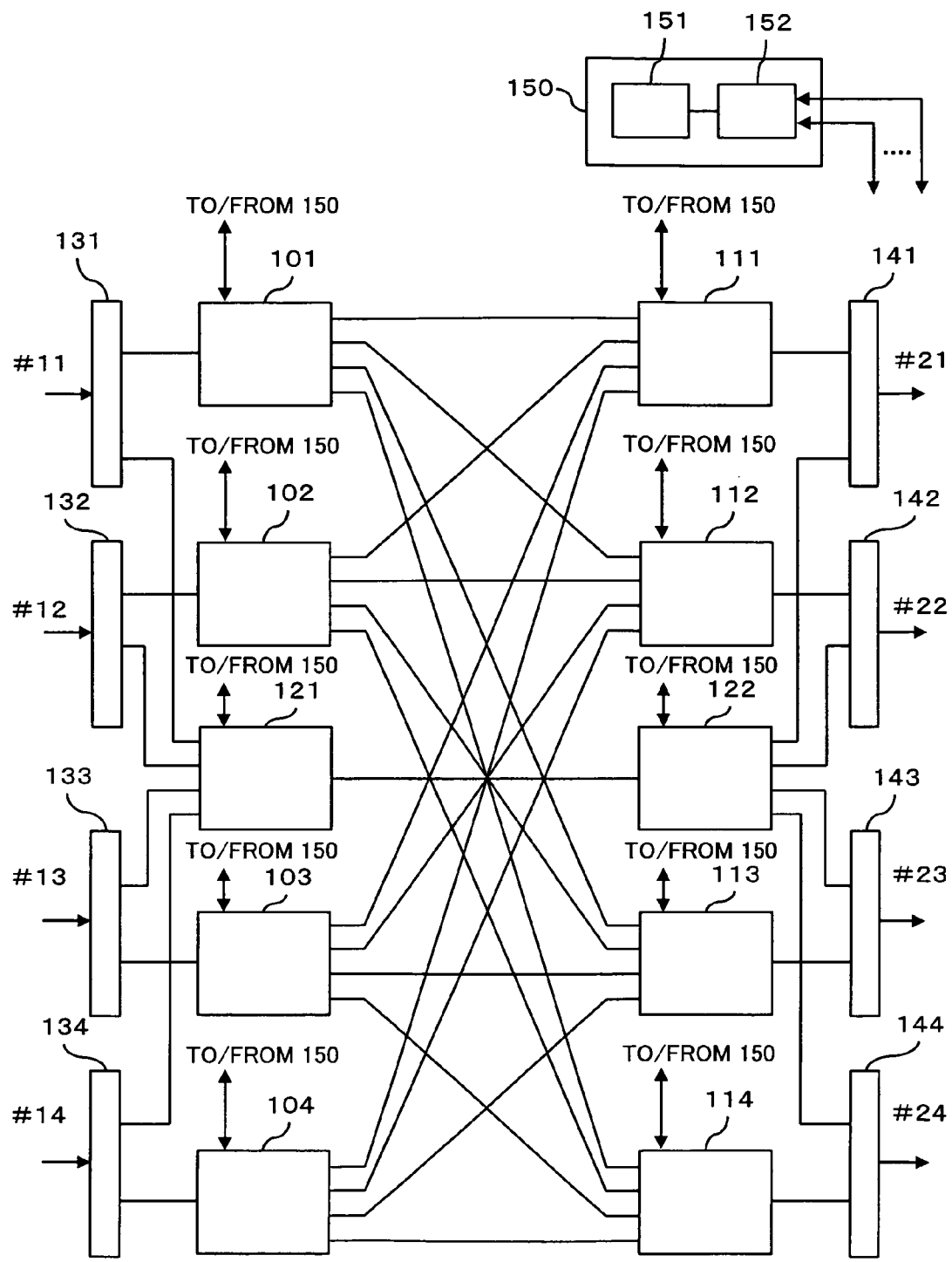
FIG. 1 is a diagrammatic view showing an optical cross connect apparatus according to a first embodiment of the present invention.

FIG. 1 shows an optical cross connect apparatus (optical apparatus) 1 according to a first embodiment of the present invention. Referring to FIG. 1, the optical cross connect apparatus 1 can perform a cross connect process for WDM signal light inputted through input ports #11 to #14 and output resulting WDM signal light from output ports #21 to #24. More particularly, the optical cross connect apparatus 1 can arbitrarily set paths in a unit of a wavelength between the input ports #11 to #14 and the output ports #21 to #24. In other words, the optical cross connect apparatus 1 can form a cross connect node in an optical network by connecting optical fibers as transmission lines to the input ports #11 to #14 and the output ports #21 to #24 described above.

The optical cross connect apparatus 1 includes upstream side wavelength selective switches (upstream side optical devices) 101 to 104 provided corresponding to the input ports #11 to #14, respectively, and downstream side wavelength selective switches (downstream side optical devices) 111 to 114 provided corresponding to the output ports #21 to #24, respectively. The optical cross connect apparatus 1 further includes a pair of standby wavelength selective switches 121 and 122, optical couplers 131 to 134 on the input ports #11 to #14 side, optical couplers 141 to 144 on the output ports #21 to #24 side and an OXC controller (Optical Cross Connect) 150.

Each of the upstream side wavelength selective switches 101 to 104 has an input connected to a corresponding one of the input ports #11 to #14 and four outputs individually connected to the four downstream side wavelength selective switches 111 to 114. Each of the upstream side wavelength selective switches 101 to 104 serves as an upstream side optical switch which changes over input WDM optical signals from the input ports #11 to #14 for each wavelength and outputs the four changed over WDM optical signals from the respective outputs thereof.

In particular, each of the upstream side wavelength selective switches 101 to 104 can distribute an input wavelength division multiplexed optical signal from a corresponding one of the input ports #11 to #14 for each wavelength to output routes to which the downstream side wavelength selective switches 111 to 114 are connected individually.

Meanwhile, each of the downstream side wavelength selective switches 111 to 114 serves as a downstream side optical switch which can receive optical signals outputted from the output routes of the upstream side wavelength selective switches 101 to 104 as inputs thereto and selectively output optical signals for each wavelength to be connected to corresponding ones of the output ports #21 to #24 as output wavelength division multiplexed optical signals. Consequently, output optical signals from the upstream side wavelength selective switches 101 to 104 can be selectively outputted as optical signals to be connected to the output ports #21 to #24 for each wavelength.

Accordingly, the upstream side wavelength selective switches 101 to 104 and the downstream side wavelength selective switches 111 to 114 described above are configured so as to change over the four output ports which are to be selected as output destinations of the lights from the four input ports #11 to #14, respectively, for each wavelength. In other words, as seen from FIG. 1, when four wavelength division multiplexed optical signals are inputted through the four input ports #11 to #14, each of the output destinations of the inputted wavelength division multiplexed optical signals is changed over to one of the four output ports #21 to #24 for each wavelength component of the inputted wavelength division multiplexed optical signals such that a wavelength division multiplexed optical signal can be outputted from each of the output ports #21 to #24. In other words, the optical cross connect apparatus 1 implements a four-input four-output optical cross connect function.

Further, each of the upstream side wavelength selective switches 101 to 104 described above forms a 1×4 wavelength selective switch which receives a wavelength division multiplexed optical signal from a corresponding one of the input ports #11 to #14 as an input to the input thereof and outputs the received wavelength division multiplexed optical signal to the four output routes connected to the downstream side wavelength selective switches 111 to 114. Similarly, each of the downstream side wavelength selective switches 111 to 114 forms a 4×1 wavelength selective switch of four inputs and one output.

Further, the standby wavelength selective switch 121 is provided on the input ports #11 to #14 side while the standby wavelength selective switch 122 is provided on the output ports #21 to #24 side. The standby wavelength selective switch 121 serves as an upstream side standby switch which is connected to the input ports #11 to #14 and can change over an output of light from the four inputs thereof for each wavelength. Meanwhile, the standby wavelength selective switch 122 is connected at an input thereof to the output of the standby wavelength selective switch 121 and at four outputs thereof to the output ports #21 to #24 such that light from the input thereof can be outputted to the four outputs thereof for each wavelength.

The standby wavelength selective switches 121 and 122 cooperate with each other such that they can set a route for the optical cross connection as a standby system which is used commonly for optical signals of wavelengths selected for the output routes of the upstream side wavelength selective switches 101 to 104 and optical signals of wavelengths selected for the output routes of the downstream side wavelength selective switches 111 to 114 as hereinafter described.

Further, the optical couplers 131 to 134 are provided corresponding to the input ports #11 to #14 and individually branch wavelength division multiplexed optical signals inputted respectively from the input ports #11 to #14 into two wavelength division multiplexed optical signals, one of which is outputted to the upstream side wavelength selective switches 101 to 104 corresponding to the input ports #11 to #14 and the other of which is outputted to the standby wavelength selective switch 121.

In other words, since the standby wavelength selective switch 121 can receive optical signals inputted through all of the input ports #11 to #14 through the optical couplers 131 to 134, it functions as a standby switch for any of the (active) upstream side wavelength selective switches 101 to 104 corresponding to the input ports #11 to #14.

Further, the optical couplers 141 to 144 are provided corresponding to the output ports #21 to #24, and multiplex output wavelength division multiplexed optical signals outputted from the downstream side wavelength selective switches 111 to 114 and an optical signal from the standby wavelength selective switch 122 and outputs multiplexed signals.

In particular, since the standby wavelength selective switch 122 can receive an output from the standby wavelength selective switch 121 as an input thereto and output an optical signal through all of the output ports #21 to #24 via the optical couplers 141 to 144, it functions as a standby switch for the (active) downstream side wavelength selective switches 111 to 114 corresponding to the output ports #21 to #24.

The OXC controller (control section) 150 generally controls the optical cross connect by the optical cross connect apparatus 1 and particularly performs changeover control between paths (wavelength paths) between input and output fibers for each wavelength set by changeover by the upstream side wavelength selective switches 101 to 104 and the downstream side wavelength selective switches 111 to 114 and a standby route for the optical cross connect by the standby wavelength selective switches 121 and 122. The OXC controller 150 includes a wavelength path table 151 and a setting changing section 152 hereinafter described.

Figure 2:
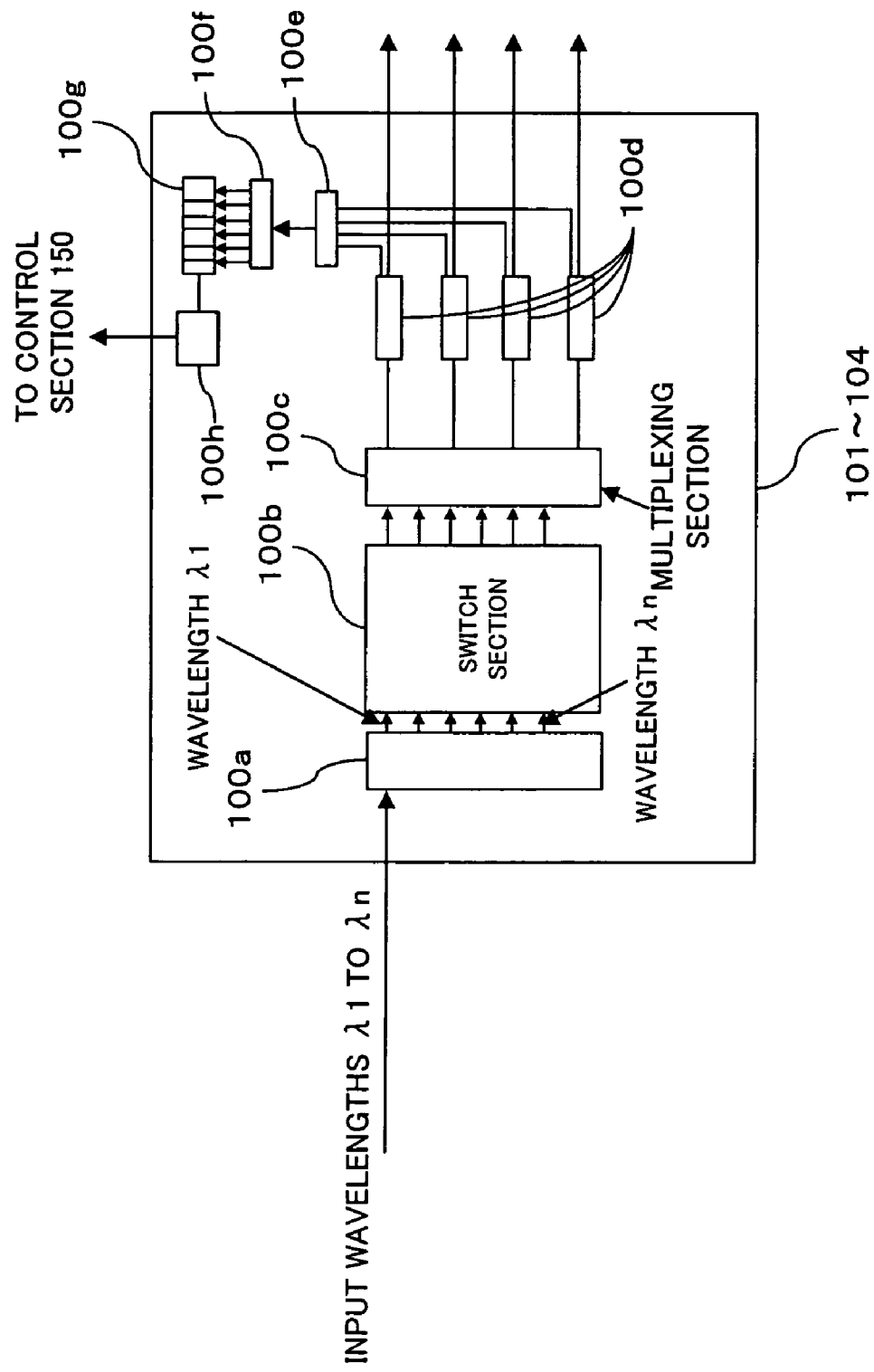
FIG. 2 is a diagrammatic view showing a wavelength selective switch in the first embodiment.
Figure 4:
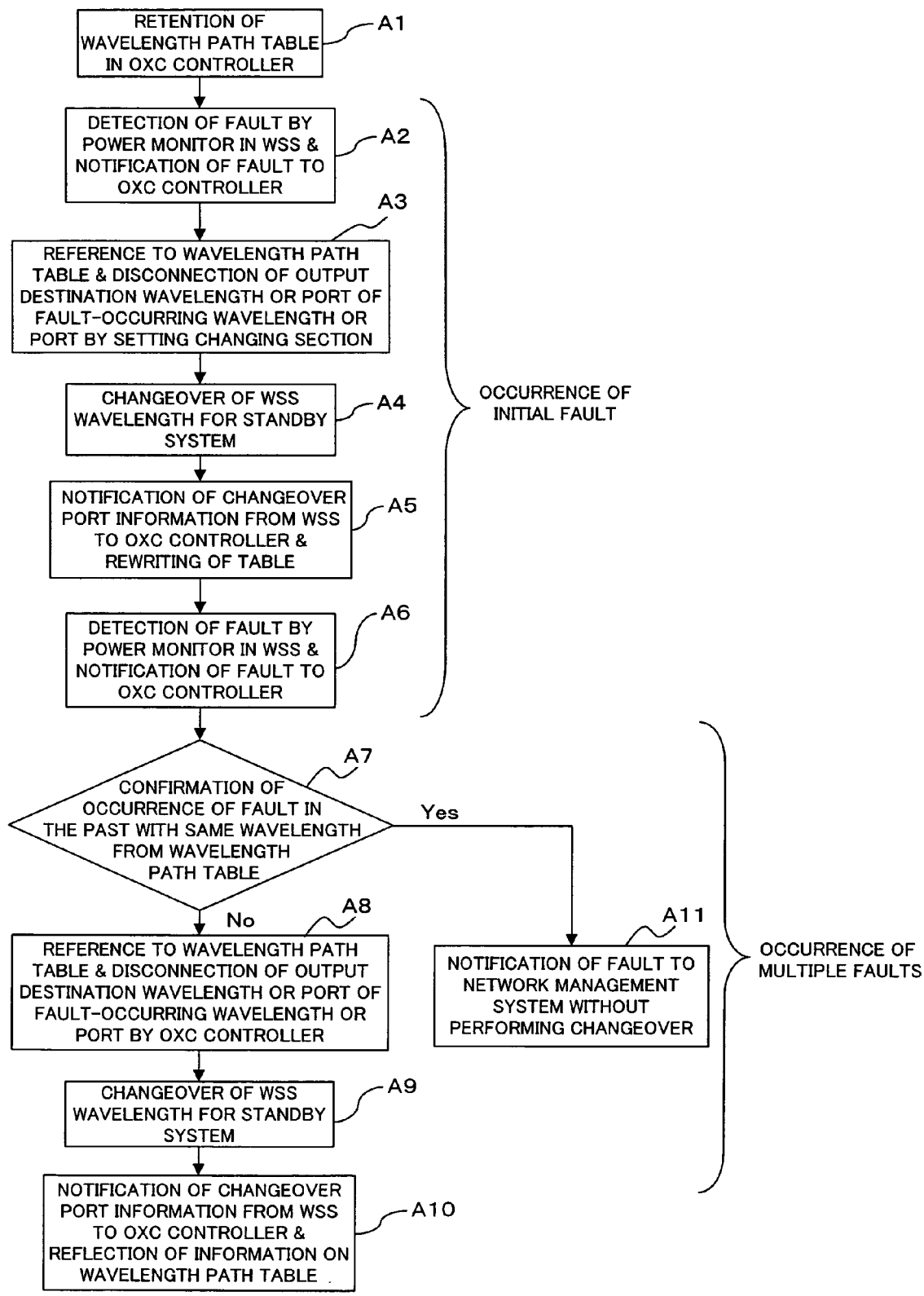
FIG. 4 is a flow chart illustrating operation of the optical cross connect apparatus according to the first embodiment of the present invention.

FIG. 2 shows the upstream side wavelength selective switches 101 to 104 described above. Referring to FIG. 2, each of the upstream side wavelength selective switches 101 to 104 includes a demultiplexing section 100a, a switch section 100b, a multiplexing section 100c, four tap couplers 100d, an optical switch 100e, a demultiplexing section 100f, a photo-detector 100g and a control section 100h.

Figure 18:
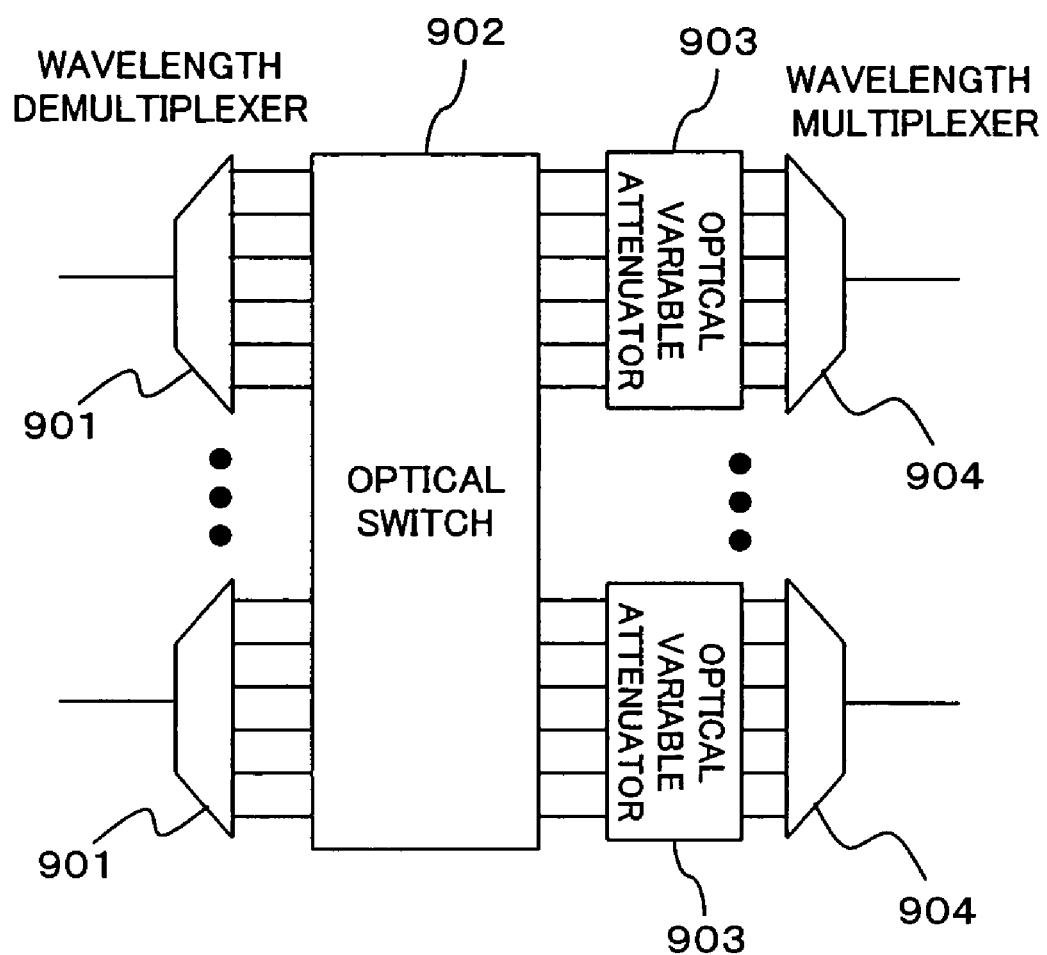
FIGS. 18 and 19 are views showing conventional optical cross connect apparatus.
Figure 19:
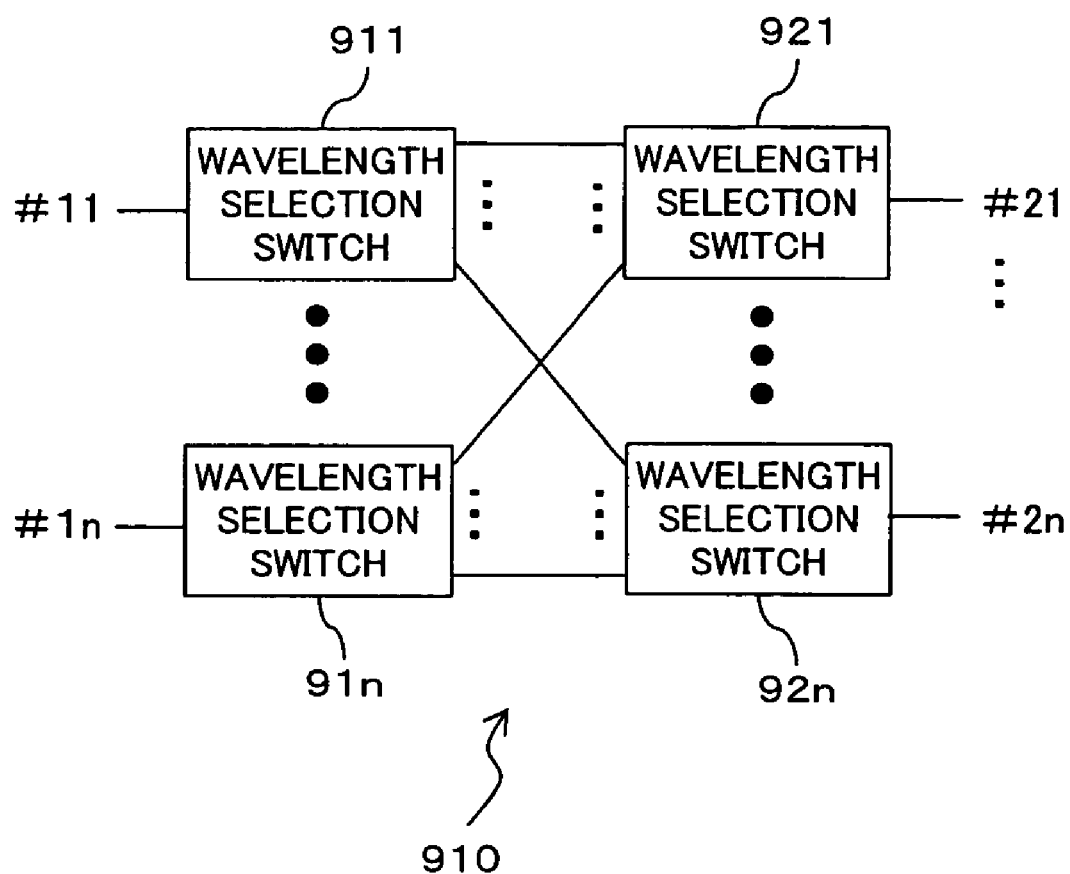
Figure 20:
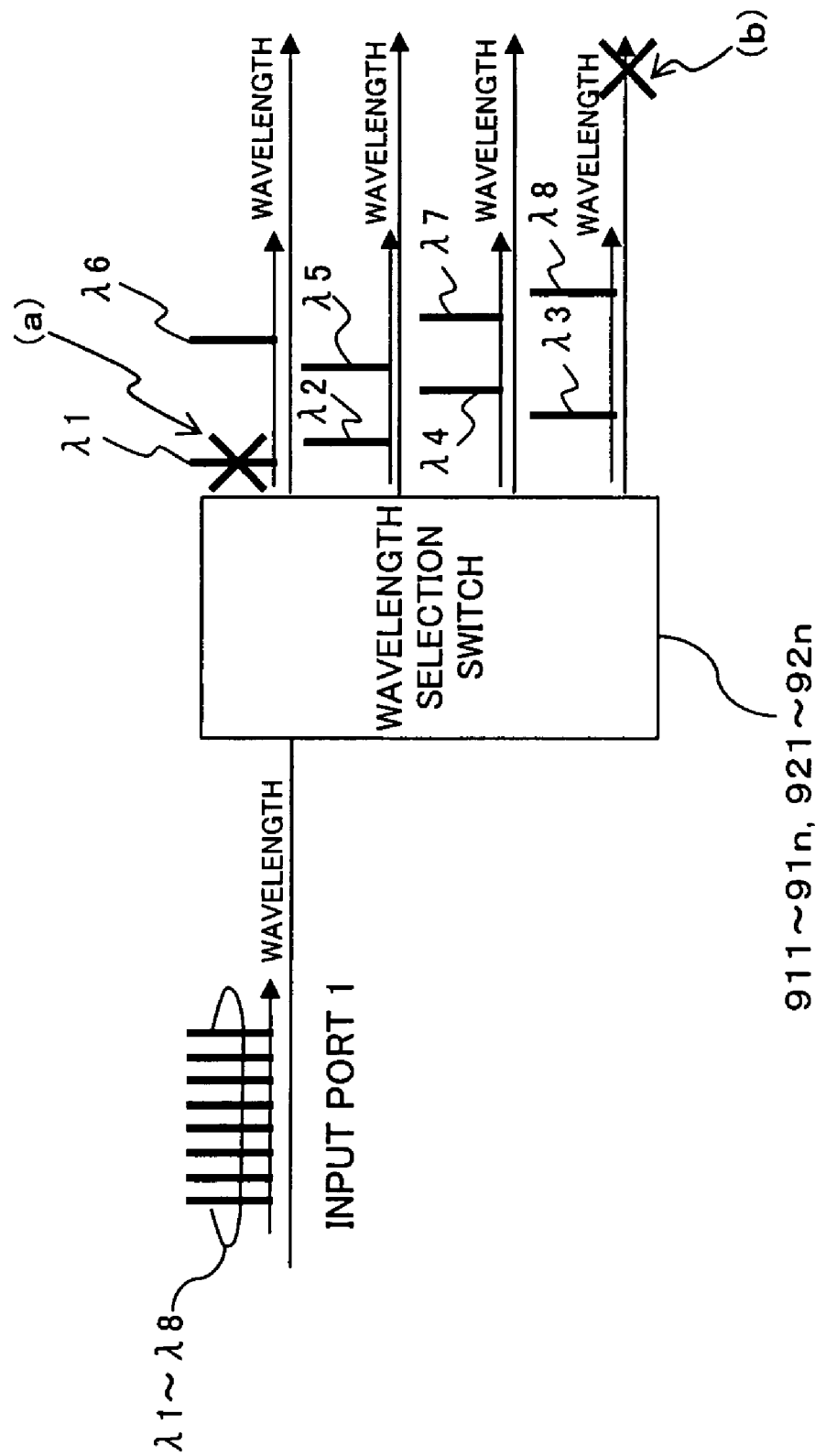
FIG. 20 is a view illustrating a subject of the conventional optical cross connect apparatus.

The demultiplexing section 100a, switch section 100b and multiplexing section 100c have functions similar to those of the wavelength demultiplexer 901, optical switch 902 and wavelength multiplexer 904 described hereinabove with reference to FIG. 18 and selectively change over, for each wavelength component, four output routes of WDM signal light inputted through one of the input ports.

Each of the tap couplers 100d branches an optical signal after the wavelength selective switching by the demultiplexing section 100a, switch section 100b and multiplexing section 100c described above, and the optical switch 100e receives the optical signals individually branched by the tap couplers 100d and selectively changes over and outputs the received optical signals for each output route along which the optical signal is received.

Further, the demultiplexing section 100f demultiplexes optical signals selectively outputted from the optical switch 100e for each wavelength component. The photo-detector 100g detects the level of the optical signal demultiplexed by the demultiplexing section 100f for each wavelength component.

The control section 100h controls the switching function of the switch section 100b described above. Further, the control section 100h detects, based on the level of an optical signal detected for each wavelength component by the photo-detector 100g, an anomaly of optical signals introduced to the output routes by the upstream side wavelength selective switches 101 to 104 in which the control section 100h is provided for each wavelength component. Then, the control section 100h outputs the detected anomaly as an alarm to the OXC controller 150.

It is to be noted that the downstream side wavelength selective switches 111 to 114 include components similar to the demultiplexing section 100a, switch section 100b and multiplexing section 100c of the upstream side wavelength selective switches 101 to 104 described hereinabove but having inputs and outputs whose arrangement is reverse to those in the upstream side wavelength selective switches 101 to 104 such that they can output signal lights inputted thereto through four input routes selectively to corresponding output ports thereof for each wavelength component.

Also the downstream side wavelength selective switches 111 to 114 have a function of detecting an anomaly of the levels of output signals to be outputted to the output ports for each wavelength component. To this end, the downstream side wavelength selective switches 111 to 114 include components which correspond to the tap couplers 100d, demultiplexing section 100f, photo-detector 100g and control section 100h of the upstream side wavelength selective switches 101 to 104 described hereinabove and outputs an anomaly of optical signals for each wavelength component to the OXC controller 150.

The wavelength path table 151 of the OXC controller 150 stores, for example, as illustrated in FIG. 3, relationships between the input ports #11 to #14 and the output ports #21 to #24 between which a wavelength path is to be set for each wavelength of wavelength division multiplexed optical signals. Wavelength path setting to the wavelength selective switches 101 to 104 and 111 to 114 is suitably controlled by the OXC controller 150 in accordance with the contents of the wavelength path table 151 described above.

For example, in the relationships illustrated in FIG. 3, a wavelength path is set such that, for example, a wavelength $\lambda 1$ of a WDM optical signal inputted to the input port #11 is connected to the output port #21. In this instance, the wavelength selective switch 101 connected to the input port #11 through the optical coupler 131 is set so that it outputs an optical signal of the wavelength λ1 to the wavelength selective switch 111, and the wavelength selective switch 111 is set so that it introduces the optical signal of the wavelength λ1 from the wavelength selective switch 101 to the output port #21.

The setting changing section 152 outputs, if alarm information of any wavelength is inputted thereto from any of the wavelength selective switches 101 to 104 and 111 to 114, a control signal for changing the setting of a wavelength path to the wavelength selective switches 101 to 104 and 111 to 114 based on the setting of the wavelength path table 151. It is to be noted that, when the setting changing section 152 changes the setting of a wavelength path, it suitably updates the contents of the wavelength path table 151 described above.

In particular, the setting changing section 152 detects an anomaly of any of optical signals selected for the output routes by the upstream side wavelength selective switches 101 to 104 from detection information from any of the upstream side wavelength selective switches 101 to 104 and the contents of the wavelength path table 151. Similarly, the setting changing section 152 detects an anomaly of any wavelength component of the optical signals selected for the output routes by the downstream side wavelength selective switches 111 to 114 from detection information from any of the downstream side wavelength selective switches 111 to 114 and the contents of the wavelength path table 151.

Then, if a notification of an anomaly of an optical signal as an alarm is received from any of the wavelength selective switches 101 to 104 and 111 to 114, then the setting changing section 152 refers to the wavelength path table 151 to change the setting of the wavelength paths so as to change over the wavelength path which suffers from the anomaly to the standby route for the optical cross connect. In particular, the setting changing section 152 changes the setting (wavelength path setting) for the upstream and downstream side wavelength selective switches regarding the wavelength path which suffers from the anomaly and also for the standby wavelength selective switches 121 and 122 so that the wavelength path suffering from the anomaly takes refuge to the standby wavelength path.

It is to be noted that the setting changing section 152 leaves the other wavelength paths between the upstream and downstream side wavelength selective switches relating to the wavelength path suffering from the anomaly without changing over them to the standby route for the optical cross connect. Consequently, there is no necessity to switch the path setting for the wavelength selective switches relating to the wavelength suffering from the anomaly including the other normal wavelength paths. Therefore, the possibility that the path setting may have an influence on communication by normal wavelength paths is eliminated thereby to achieve efficient utilization of a wavelength path which can be set by the standby wavelength selective switches 121 and 122.

A1-2. Operation and Advantages

A1-21. Change of a Wavelength Path to the Standby Route for the Optical Cross Connect In the optical cross connect apparatus 1 according to the first embodiment having such a configuration as described above, since the standby (for redundant use) wavelength selective switches 121 and 122 are used commonly by the wavelength selective switches 101 to 104 and 111 to 114 through the optical couplers 131 to 134 and 141 to 144 on the input and output sides of the apparatus, when a fault on an individual wavelength occurs with any of input/output routes of the wavelength selective switches 101 to 104 and 111 to 114 connected to the ports #11 to #14 and #21 to #24, respectively, or with any of paths between the ports #11 to #14 and #21 to #24, the fault can be repaired by an in-service operation against the fault.

For example, in a state wherein the optical cross connect apparatus 1 operates normally without suffering from any fault, route changeover of optical signals by the wavelength selective switches 101 to 104 and 111 to 114 can be performed normally based on the setting of the wavelength path table 151 of the OXC controller 150. Therefore, a cross connect process for the paths between the input ports #11 to #14 and the output ports #21 to #24 is performed for each wavelength component (step A1). It is to be noted that, at this point of time, the standby wavelength selective switches 121 and 122 are inoperative.

Then, if a fault of an optical signal is detected with regard to the wavelength selective switches 101 to 104 and 111 to 114 by the optical signal fault detection function, then the alarm outputting function outputs the fault of the optical signal as an alarm to the OXC controller 150 (step A2). If the OXC controller 150 receives an alarm from any of the wavelength selective switches 101 to 104 and 111 to 114, then it changes the path to the standby path for the optical cross connect in response to contents of the alarm.

In particular, if the alarm is issued because of a fault of a wavelength path, then the setting changing section 152 refers to the wavelength path table 151 and disconnects any wavelength path for the wavelength which suffers from the fault (step A3). For example, in a case wherein wavelength paths for optical signals of the wavelengths λn−1 and λn are set between the input port #11 and the output port #24 in accordance with the contents of the wavelength path table 151 illustrated in FIG. 3, if a fault occurs with the wavelength path λn which passes the wavelength selective switches 101 and 114, then changeover of the wavelength path which suffers from the fault is stopped.

Figure 5:
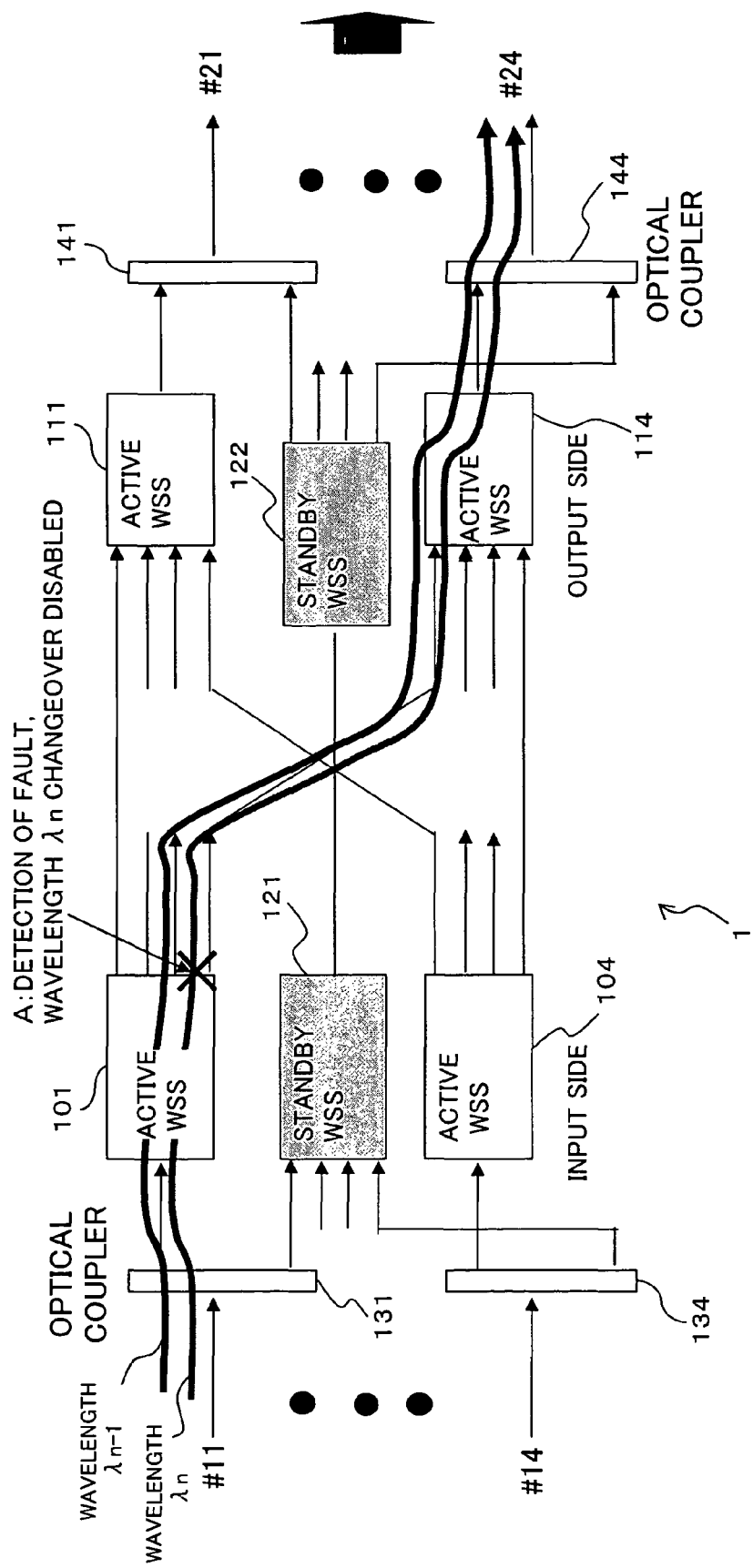
Figure 6:
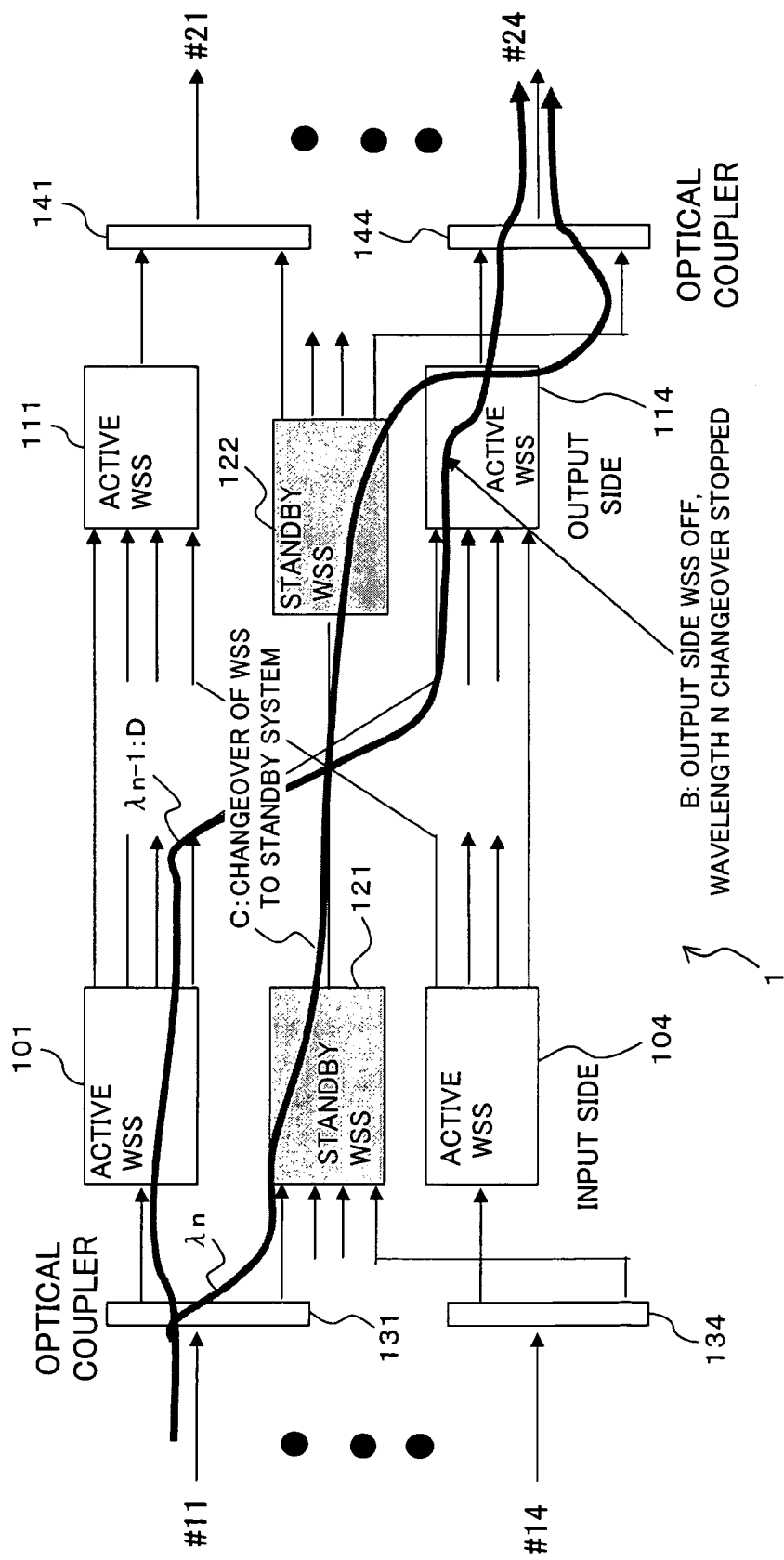

In particular, if an abnormal state such as a fault occurs with an optical signal of the wavelength λn at the wavelength selective switch 101 and disables the changeover (refer to A of FIG. 5), the setting changing section 152 shown in FIG. 1 recognizes it from an alarm and refers to the wavelength path table 151 to stop the changeover of the wavelength λn by the wavelength selective switch 114 and disconnect the wavelength path for the wavelength λn which suffers from the fault (refer to B of FIG. 6). It is to be noted that, if a fault occurs with the wavelength selective switch 114 on the downstream side, then changeover of the wavelength λn by the wavelength selective switch 101 for the wavelength path with which the fault occurs is stopped.

Also where an alarm is generated because of a fault on a changeover route of a wavelength selective switch, the path to a portion of an output destination of the fault port is disconnected (step A3). For example, if an abnormal state such as a fault occurs with the route itself which interconnects the input port #11 and the output port #24 through the wavelength selective switches 101 and 114 in accordance with the contents of the wavelength path table 151 described hereinabove with reference to FIG. 3 and changeover is disabled thereby, then the setting changing section 152 recognizes this from an alarm and refers to the wavelength path table 151 to stop changeover of the wavelengths λn−1 and λn by the wavelength selective switch 114 and disconnect the routes (wavelength paths for the wavelengths λn−1 and λn) which suffer from the fault.

In particular, if an abnormal state such as a fault occurs with the wavelength selective switch 101 on the upstream side and disables route changeover to the wavelength selective switch 114, then the changeover of light from the wavelength selective switch 101 by the wavelength selective switch 114 (in this instance, the wavelengths λn−1 and λn) is stopped. It is to be noted that, if a fault occurs with the wavelength selective switch 114 on the downstream side, changeover of light (wavelengths λn−1 and λn) by the wavelength selective switch 101 on the upstream side relating to the changeover route with which the fault occurs is stopped.

Then, in order to repair any path which suffers from the fault (wavelength path of a wavelength path unit or wavelength paths of a changeover route unit), the setting changing section 152 changes the setting of the standby wavelength selective switches 121 and 122 (step A4).

As a particular example, a case wherein a fault with the wavelength path λn between the input port #11 and the output port #24 is repaired is described. In this instance, the setting changing section 152 outputs an instruction to change the setting of wavelength selection changeover from the setting changing section 152 to the standby wavelength selective switches 121 and 122. Then, the setting of the switching function (refer to reference numeral 100b of FIG. 2) for the stand by wavelength selective switch 121 is changed so that an optical signal of the wavelength λn from the input port #11 inputted through the optical coupler 131 may be outputted to the standby wavelength selective switch 122. Similarly, the setting of the switching function for the standby wavelength selective switch 122 is changed so that an optical signal of the wavelength λn from the standby wavelength selective switch 121 may be outputted to the optical coupler 141.

Consequently, the wavelength path λn between the input port #11 and the output port #24 is restored by the change of the setting of the standby wavelength selective switches 121 and 122 (refer to C of FIG. 6) It is to be noted that, in this instance, since the path for the wavelength λn−1 which interconnects the wavelength selective switch 101 and the wavelength selective switch 114 and with which the fault occurs can communicate normally, it is left without being changed over to the standby path for the optical cross connect (refer to D of FIG. 6).

Accordingly, even if changeover of the wavelength path λn described above occurs, it does not have an influence on the communication of the wavelength path of the wavelength n−1 which is normal, and effective utilization of wavelength path resources which can be set by the standby wavelength selective switches 121 and 122 is achieved.

In other words, when a fault occurs with an output of the wavelength path n of the wavelength selective switch 101 serving as a first upstream side optical device which is one of the upstream side optical devices, the standby wavelength selective switch 121 can output light of the wavelength λn inputted from the input port #11 corresponding to the wavelength selective switch 101, and the standby wavelength selective switch 122 can output light inputted to the output port #24 corresponding to the wavelength selective switch 114 to which the wavelength λn is outputted from the wavelength selective switch 101.

Further, when a fault occurs with the connection of the wavelength selective switch 101 which is a first upstream side optical device which is one of output side optical devices to the wavelength selective switch 114 as a first downstream side optical device which is one of downstream side optical devices, the standby wavelength selective switch 121 outputs light of a wavelength which is inputted from the input port #11 corresponding to the wavelength selective switch 101 and is to be outputted from the wavelength selective switch 101 to the wavelength selective switch 114. Further, the standby wavelength selective switch 122 can output the inputted light to the output port #24 corresponding to the wavelength selective switch 114.

It is to be noted that, if setting of the standby route which passes the standby wavelength selective switches 121 and 122 is performed successfully as described above, then a functioning section (refer to reference character 100h of FIG. 2) serving as a control section issues a notification of this to the OXC controller 150.

Then, the setting changing section 152 of the OXC controller 150 rewrites the contents of the wavelength path table 151, for example, in such a manner as seen in FIG. 7 in accordance with the contents of the switched wavelength path (step A5). It is to be noted that "Standby output port #24" in FIG. 7 represents connection by a path which connects to the output port #24 through the standby wavelength selective switches 121 and 122.

Further, in a case wherein the wavelength path by the standby wavelength selective switches 121 and 122 described above is used, if an alarm is outputted from the control section 100h as a WSS internal power monitor function section in any of the wavelength selective switches 101 to 104 and 111 to 114 (step A6), then the setting changing section 152 refers to the wavelength path table 151 to confirm whether or not a fault on the same wavelength has occurred already (step A7). In other words, the setting changing section 152 confirms this depending upon whether or not wavelengths of the "Standby output port" registered in the wavelength path table 151 as described above include the wavelength relating to the alarm generated in the current cycle.

Here, if wavelengths of the "Standby output port" registered in the wavelength path table 151 do not include the wavelength relating to the alarm generated in the current cycle, then a fault has not occurred on the same wavelength as yet, and the wavelength path of the wavelength relating to the alarm generated in the current cycle can be set to the standby wavelength selective switches 121 and 122.

In this instance, the standby route for the optical cross connect is set under the control of the OXC controller 150 in a similar manner as at steps A3 to A5 described hereinabove [steps A8 to A10 from the NO route of step A7 (steps A8 to A10 correspond to steps A3 to A5, respectively)].

However, if wavelengths of the "Standby output port" registered in the wavelength path table 151 include the wavelength relating to the alarm generated in the current cycle (occurrence of multiple faults), then the standby path of the wavelength same as the registered wavelength of the "Standby output port" cannot be set further. In this instance, the setting changing section 152 does not perform changeover to the standby route for the optical cross connect but issues a notification of the fault to a host apparatus not shown such as, for example, a network management system (step A11 from the YES route of step A7).

Figure 8:
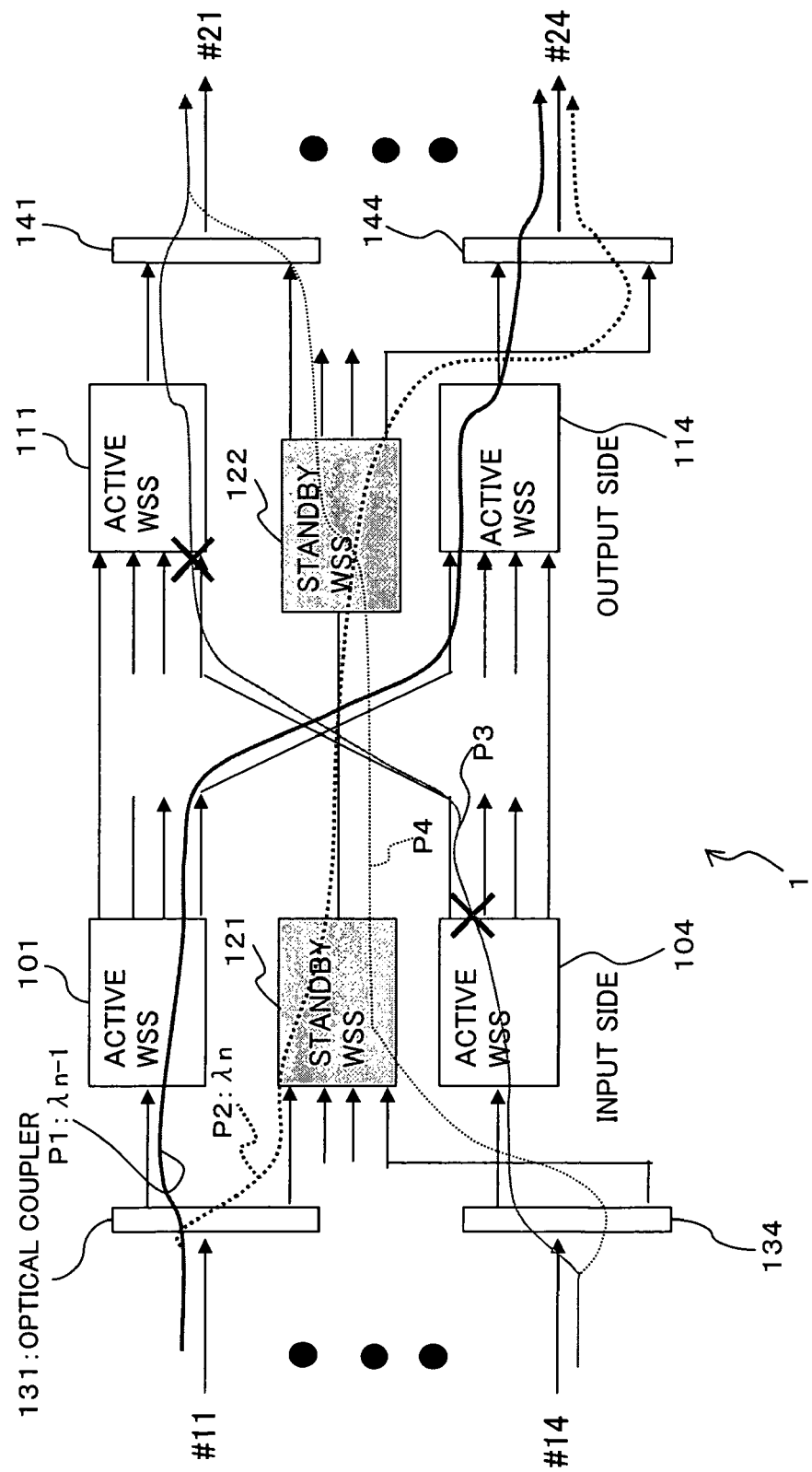

For example, a case illustrated in FIG. 8 is described. FIG. 8 illustrates a case wherein multiple faults occur where a wavelength path P1 of the wavelength λn−1 through the wavelength selective switches 101 and 114 and another wavelength path P2 of the wavelength λn through the standby wavelength selective switches 121 and 122 are set between the input port #11 and the output port #24 (refer to the wavelength path table 151 of FIG. 7).

Here, if a fault occurs with a wavelength path, for example, of a wavelength λ3, λ4 or λn−1 from among wavelength paths (refer to the wavelength path table 151 of FIG. 7) of wavelengths λ3, λ4, λn−1 and λn set as a wavelength path P3 interconnecting the input port #14 and the output port #21, then since the standby path is not set to the wavelength path of any of the wavelengths λ3, λ4 and λn−1, a wavelength path P4 can be set by the standby wavelength selective switches 121 and 122 as seen in FIG. 8.

However, if a fault occurs with the wavelength path of the wavelength λn set as the wavelength path P3, then since the wavelength path P2 of the wavelength λn is set already as the standby wavelength path of the standby wavelength selective switches 121 and 122, the wavelength path P4 cannot be set for the wavelength λn.

Accordingly, if such multiple faults as described above occur with a plurality of wavelength ports, then route changeover to the standby system is permitted irrespective of the setting of the input and output ports. Furthermore, where the present configuration is employed, also when a fault occurs with one of active wavelengths in the wavelength selective switches 101 to 104 and 111 to 114, only the path (wavelength path) can be changed over to the standby system. Consequently, the fault does not have any influence on the wavelength paths of the other wavelengths.

Figure 9:
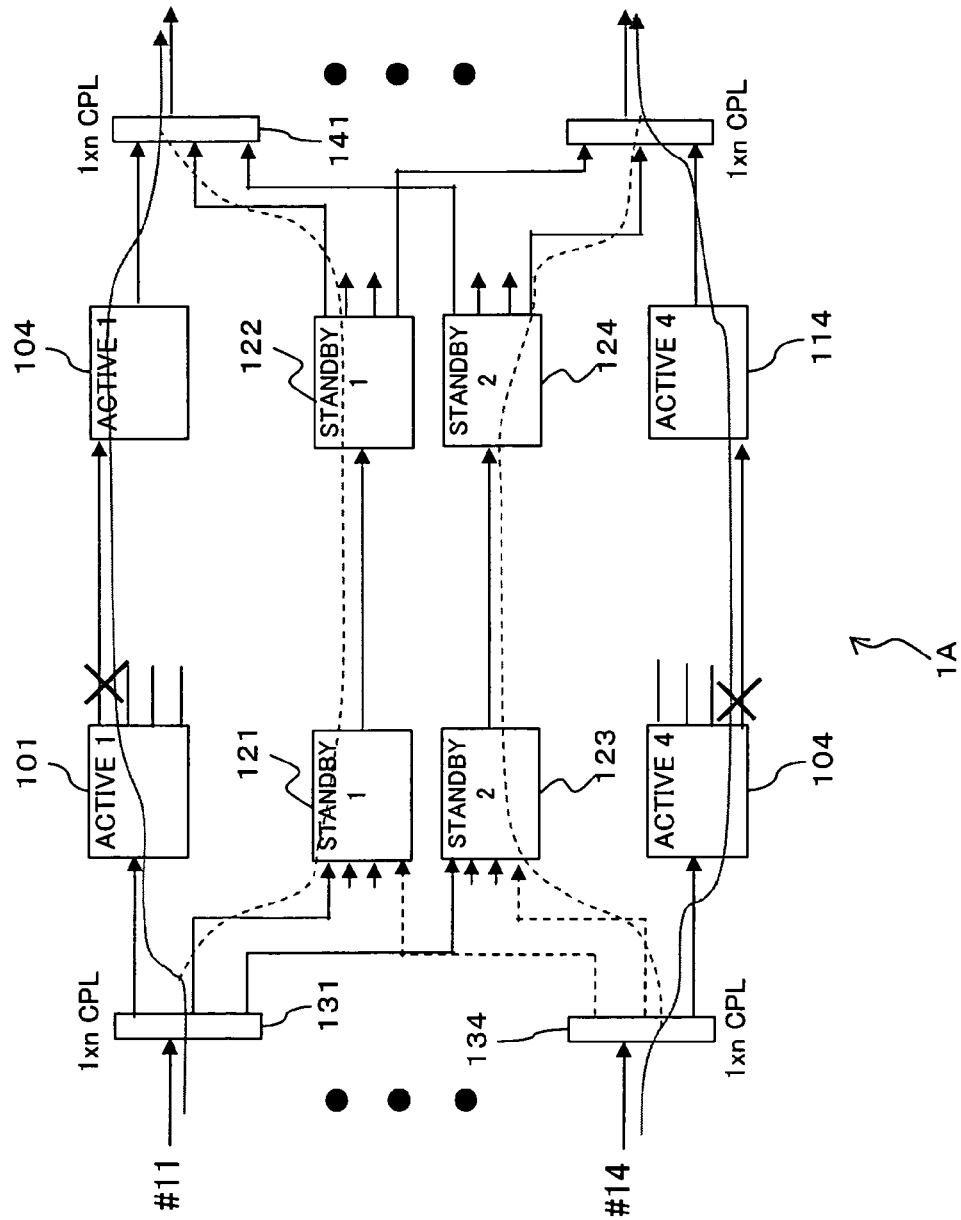
FIG. 9 is a diagrammatic view showing a modification to the first embodiment of the present invention.

Further, where standby wavelength selective switches 121 to 124 are provided a plurality of standby systems as in the case of, for example, an optical cross connect apparatus 1A shown in FIG. 9 (which includes two standby systems), also such multiple faults on the same wavelength as described above can be prevented. In this instance, the branching number of WDM signal light of the optical couplers 131 to 134 and the multiplexing number of WDM signal light beams of the optical couplers 141 to 144 increase suitably in response to the number of standby system of the wavelength selective switches A1-22. Exchanging Operation of an Active Wavelength Selective Switch with which an Anomaly Occurs Now, a procedure of a replacing operation of a wavelength selective switch with which an anomaly such as a fault which causes changeover to such a wavelength path by the standby wavelength selective switches 121 and 122 as described above occurs is described.

It is to be noted that, while, in the following description, a procedure for performing an in-service replacing operation of any of the upstream side wavelength selective switches 101 to 104 is described, also where a replacing operation is performed for any of the downstream side wavelength selective switches 111 to 114, it can be performed similarly as in the case of replacement of the upstream side wavelength selective switch 101 described below.

A1-221. Exchanging Operation of a Wavelength Selective Switch when a Standby Path is Set Because of a Fault on a Single Wavelength Path For example, in a case wherein such a standby wavelength path as described hereinabove with reference to FIG. 6 is set, it is necessary to perform a replacing operation of the wavelength selective switch 101 which makes a cause of changeover to the standby wavelength path. As a particular example, a replacing operation of the wavelength selective switch 101 in the case illustrated in FIG. 6 is described in accordance with items (1) to (11) below.

(1) First, information of wavelengths which pass through the wavelength selective switch 101 with which a fault occurs and relating ports is acquired from the wavelength path table 151 (refer to FIG. 7) of the OXC controller 150. (2) Then, changeover of the standby wavelength selective switch 121 on the standby input side of the passing wavelength is turned on. In this instance, the wavelengths which pass the wavelength selective switch 101 are the wavelengths λ1 to λ4 and λn−1. Accordingly, changeover of the standby wavelength selective switch 121 is turned on so as to select output routes for the wavelengths λ1 to λ4 and λn−1 from the optical coupler 131.

(3) Then, the service of the wavelength selective switch 101 with which the fault occurs is stopped to establish a state wherein the wavelength selective switch 101 can be removed. (4) Thereafter, the switch of the standby wavelength selective switch 122 on the standby output side is turned on. At this stage, the routes in the optical cross connect apparatus 1 are changed over. In other words, the switches in the optical cross connect apparatus 1 are switched so that the optical signals of the wavelengths λ1 to λ4 and λn−1 from the standby wavelength selective switch 121 may be outputted to the optical coupler 141.

(5) Then, changeover of the ports from the wavelength selective switch 101 with which the fault occurs is turned off by the downstream side wavelength selective switches 111 to 114. In this instance, changeover of the wavelength paths of the wavelengths λ1 and λ2 through the wavelength selective switch 111, wavelength paths of the wavelengths λ3 and λ4 through the wavelength selective switch 112 and wavelength path of the wavelength λn−1 through the wavelength selective switch 114 is turned off.

(6) Further, after the standby wavelength paths described above are set, the standby wavelength selective switches 121 and 122 issue a notification of the setting information regarding the wavelength paths relating to the connections to the OXC controller 150. The OXC controller 150 updates the connection information managed in the wavelength path table 151.

(7) Thereafter, a replacing operation of the wavelength selective switch 101 with which the fault occurs is performed, and then the replaced wavelength selective switch 101 is rendered operative again. At this time, the OXC controller 150 acquires the latest wavelength path setting information of the wavelength path table 151. (8) Then, the port changeover setting of the downstream side wavelength selective switches 111 to 114 is turned on based on the acquired wavelength path setting information to turn on the changeover routes for introducing the optical signals from the wavelength selective switch 101 after the replacing operation.

(9) Further, the selection of the standby wavelength selective switch 121 is turned off, and (10) the route changeover of the wavelength selective switch 101 after the replacing operation in accordance with the wavelength path table 151 is turned on to perform recovery of the wavelength paths. (11) Thereafter, the selection of the standby wavelength selective switch 122 on the output port side is turned off to restore the initial state.

A1-222. Exchanging Operation of a Wavelength Selective Switch when Multiple Faults Occur Exchanging of a wavelength selective switch when such multiple faults as illustrated in FIG. 8 occur is performed, for example, in the following manner.

In particular, when changeover of all of regular active channels in the wavelength selective switch 101 with which a fault occurs to the standby wavelength selective switch 121 is to be performed, the OXC controller 150 first refers to the wavelength path table 151 to acquire coordination information between active wavelengths of the upstream side wavelength selective switches 101 and 104 with which a fault occurs and output ports of connection destinations of them to check presence/absence of protection by a higher hierarchy [for example, SONET (Synchronous Optical Network) or MPLS (Multi Protocol Label Switching) of wavelength paths with which multiple faults occur.

In particular, if any of the routes which suffer from the multiple faults can be protected in a higher hierarchy, then changeover of the routes is performed through the protection in the higher hierarchy. However, any route which is not protected in a higher hierarchy (where a plurality of routes are not protected, preferentially that one which has a comparatively high priority degree) is bypassed to a standby route for the optical cross connect similarly as in the case described hereinabove, and a replacing operation of the wavelength selective switch which suffers from the fault is performed.

In particular, the wavelengths $\lambda 1$ to $\lambda 4$ and $\lambda n-1$ which have been changed over by any of the wavelength selective switches suffering from the fault which is not protected in a higher hierarchy (for example, the wavelength selective switch 101) are changed over to the port connecting to the standby wavelength selective switch 121 so that they are bypassed for switching. Thereafter, operation of the wavelength selective switch 101 which suffers from the fault is stopped. Then, changeover of the standby wavelength selective switch 122 on the output port side is performed, thereby completing the wavelength path changeover in which the bypass path is used.

Thereafter, switching of the ports from the wavelength selective switch 101 suffering from a fault is turned off by the downstream side wavelength selective switches 111 to 114 in order to prevent otherwise possible malfunction, and replacement of the wavelength selective switch 101 suffering from the fault is performed. After the replacement, path information of the wavelength paths which pass the standby wavelength selective switches 121 and 122 is acquired, and the switches of the ports of the downstream side wavelength selective switches 111 to 114 are turned on so that the routes from the wavelength selective switch 101 may be rendered effective.

Thereafter, the changeover of the wavelength selective switch 101 on the input port side to the redundant path is canceled and the wavelength path setting by the wavelength selective switch 101 after the replacing operation is turned on to recover the wavelength paths which pass the replaced wavelength selective switch 101. Finally, the switching of the standby wavelength selective switch 122 on the output port side is turned off thereby to restore the initial state.

A1-3. Contrast with an Alternative Case Wherein a Standby Wavelength Selective Switch is Provided Individually for each of the Active Wavelength Selective Switches 101 to 104 and 111 to 114

In this manner, with the optical cross connect apparatus 1 according to the first embodiment, since the standby wavelength selective switches 121 and 122 capable of setting a route for the optical cross connect are provided as a standby system which is used commonly for optical signals of wavelengths selected for the output routes by the upstream side wavelength selective switches 101 to 104 and optical signals of wavelengths selected for the output routes by the downstream side wavelength selective switches 111 to 114, there is an advantage that, when a wavelength selective switch is to be replaced, an otherwise possible influence of the replacement on the other connects which operate regularly is eliminated and the standby wavelength path resources can be utilized effectively. Further, there is another advantage that repair of a fault can be performed by in-service operation (while the apparatus is operating).

Figure 10:
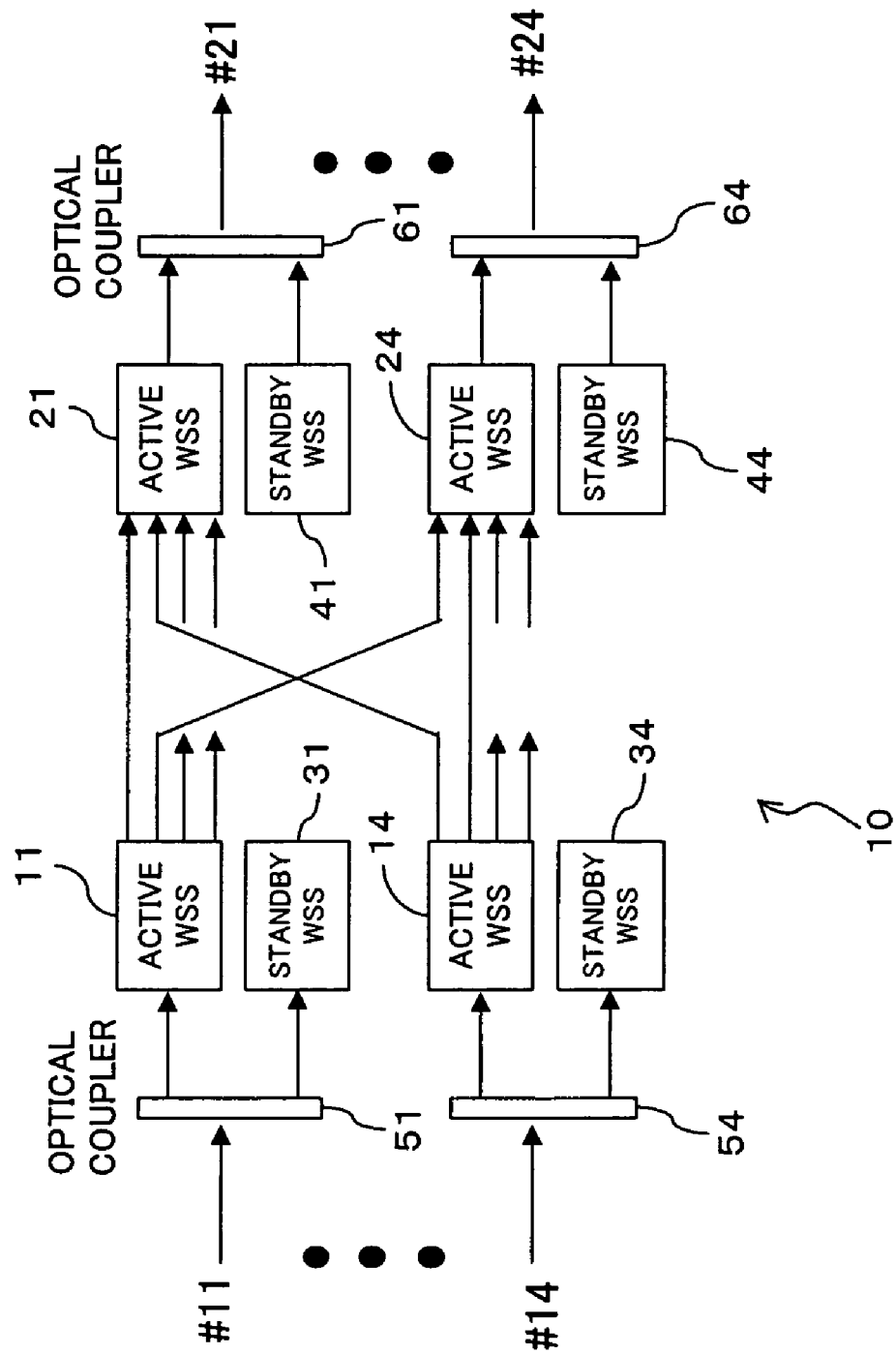
FIG. 10 is a diagrammatic view showing a comparative example for comparison in operation and effect with the first embodiment of the present invention.

Further, where the optical cross connect apparatus 1 is compared with such an optical cross connect apparatus 10 which includes a standby system as shown in FIG. 10, there is an advantage that, by restricting increase of the number of wavelength selective switches provided in the standby system, the availability of the wavelength selective switches which are in an active state can be enhanced and miniaturization of the apparatus can be anticipated and besides the power consumption can be reduced.

Here, the optical cross connect apparatus 10 shown in FIG. 10 includes wavelength selective switches 11 to 14 and 21 to 24 and which correspond to the wavelength selective switches 101 to 104 and 111 to 114 shown in FIG. 1 and includes wavelength selective switches 31 to 34 and 41 to 44 provided for the wavelength selective switches 11 to 14 and 21 to 24, respectively.

It is to be noted that optical couplers 51 to 54 in FIG. 10 individually branch light from input ports #11 to #14 into two beams, one of which is outputted to the wavelength selective switches 11 to 14 which are active switches and the other of which is outputted to the wavelength selective switches 31 to 34 which are standby switches. Meanwhile, optical couplers 61 to 64 individually multiplex output optical signals of the wavelength selective switches 21 to 24 which are active switches and output optical signals from the wavelength selective switches 41 to 44 which are standby switches and output the multiplexed optical signals to the corresponding ones of the output ports #21 to #24.

Consequently, the optical cross connect apparatus 10 has a 1+1 redundant configuration which normally includes two systems including a system of the wavelength selective switches 11 to 14 and 21 to 24 which are active switches and another system of the wavelength selective switches 31 to 34 and 41 to 44 which are standby switches having equivalent functions to those of the wavelength selective switches 11 to 14 and 21 to 24.

In such an optical cross connect apparatus 10 as shown in FIG. 10, since it is necessary to always keep the standby system, which is not used in regular operation, in an operable state, a large size configuration of the apparatus and high power consumption cannot be avoided.

In contrast, with the optical cross connect apparatus 1 according to the first embodiment, the number of wavelength selective switches provided in the standby system can be reduced significantly and the availability of those wavelength selective switches which are in an active state can be enhanced when compared with the case of FIG. 10. Further, miniaturization of the apparatus can be achieved and the power consumption can be reduced.

Further, with the optical cross connect apparatus 1 according to the first embodiment, such loss as branching loss can be suppressed when compared with second and third modifications hereinafter described. Besides, a good isolation characteristic can be maintained.

A2. First Modification to the First Embodiment

While the first embodiment described in detail above is the 4-input 4-output (4×4) optical cross connect apparatus 1, the present invention is not limited to this but may be applied to an N×M cross connect apparatus having a different number of (N) input ports and/or a different number of (M) output ports.

Figure 11A:
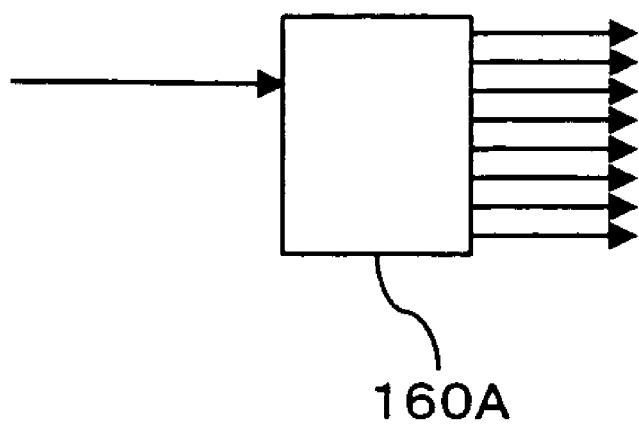
FIGS. 11(a) and 11(b) are views illustrating a first modification to the first embodiment of the present invention.
Figure 11B:
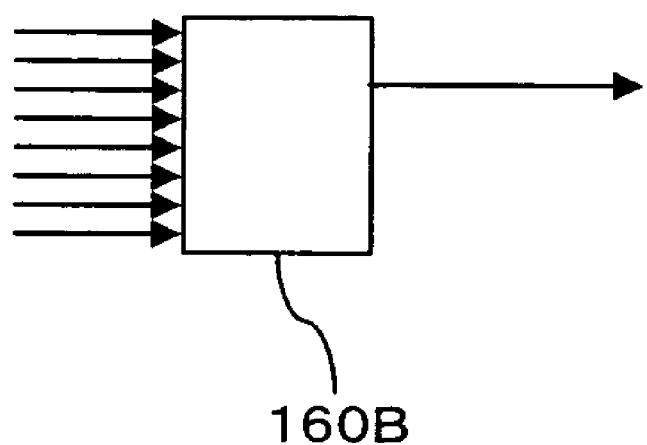

For example, even when such a 1×8 wavelength selective switch 160A as shown in FIG. 11(*a*) is used on the upstream side and such an 8×1 wavelength selective switch 160B as shown in FIG. 11(b) is used on the downstream side to configure an 8×8 optical cross connect apparatus, a standby wavelength selective switch capable of setting a route for the optical cross connect as a standby system which is used commonly for optical signals of wavelengths selected for the output routes by the upstream side wavelength selective switches and optical signals of wavelengths selected for the output routes by the downstream side wavelength selective switches should be provided on the input port side and the output port side in accordance with the first embodiment.

A3. Second Modification to the First Embodiment

Figure 12:
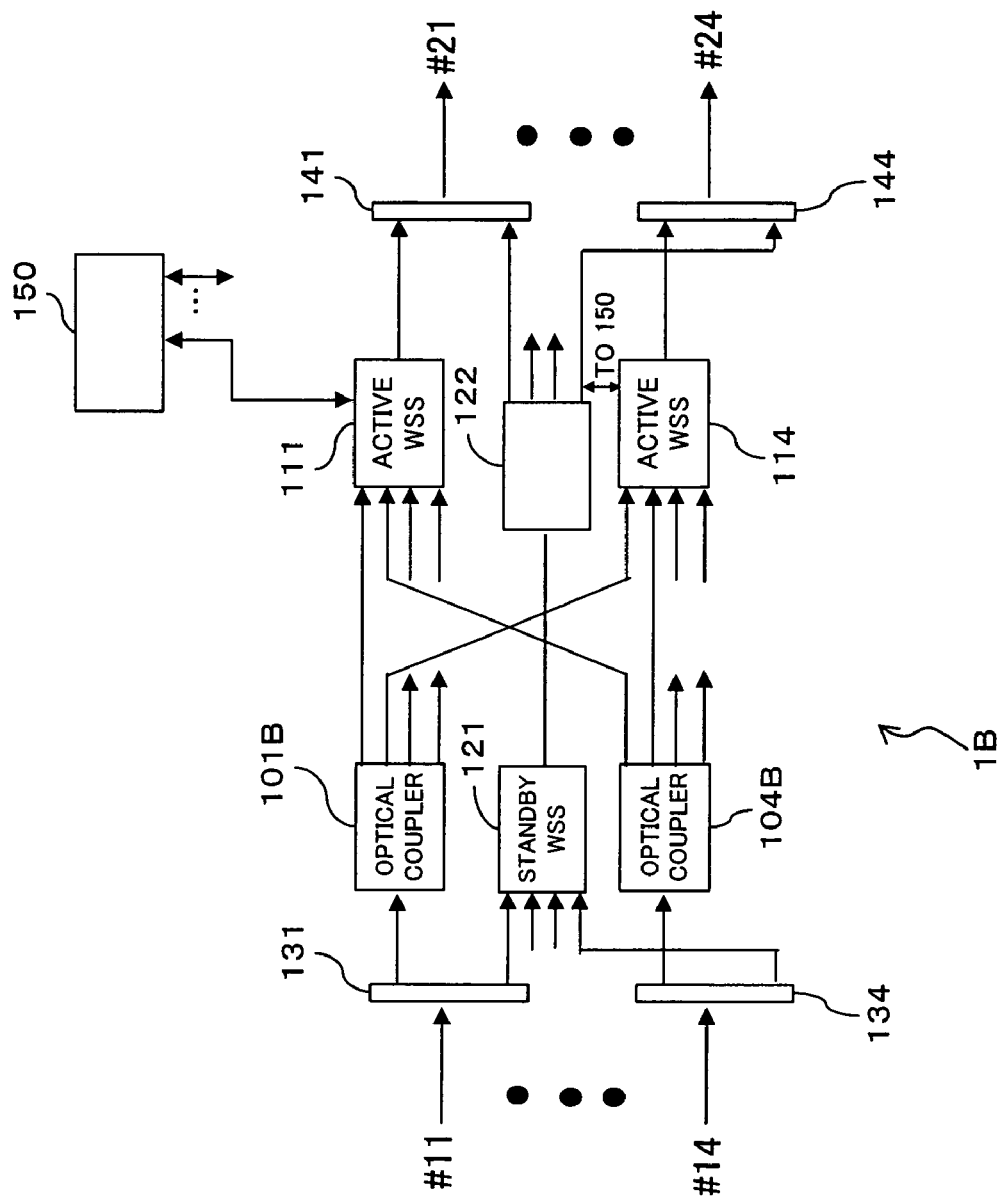
FIG. 12 is a diagrammatic view showing a second modification to the first embodiment of the present invention.

FIG. 12 shows an optical cross connect apparatus 1B according to a second modification to the first embodiment of the present invention. In the optical cross connect apparatus 1B shown in FIG. 12, different from the first embodiment described hereinabove, 1×4 optical couplers 101B to 104B which branch each of input wavelength division multiplexed optical signals from the input ports #11 to #14 into a number of optical signals equal to the number of (four) output ports #21 to #24 are provided as upstream side optical devices.

In particular, the downstream side wavelength selective switches 111 to 114 receive WDM light from all of the input ports #11 to #14 through the optical couplers 101B to 104B and selectively output the optical signals of wavelengths from the input ports to be introduced to the corresponding ones of the output ports #21 to #24 to implement an optical cross connect function.

Then, the standby wavelength selective switches 121 and 122 can set a route for the optical cross connect as a standby system for common use for optical signals of the wavelengths selected for the output routes by the downstream side wavelength selective switches 111 to 114, similarly as in the case of the first embodiment described hereinabove.

Also in the optical cross connect apparatus 1B having such a configuration as described above, advantages similar to those of the first embodiment described hereinabove can be achieved by the standby wavelength selective switches 121 and 122.

A4. Third Modification to the First Embodiment

Figure 13:
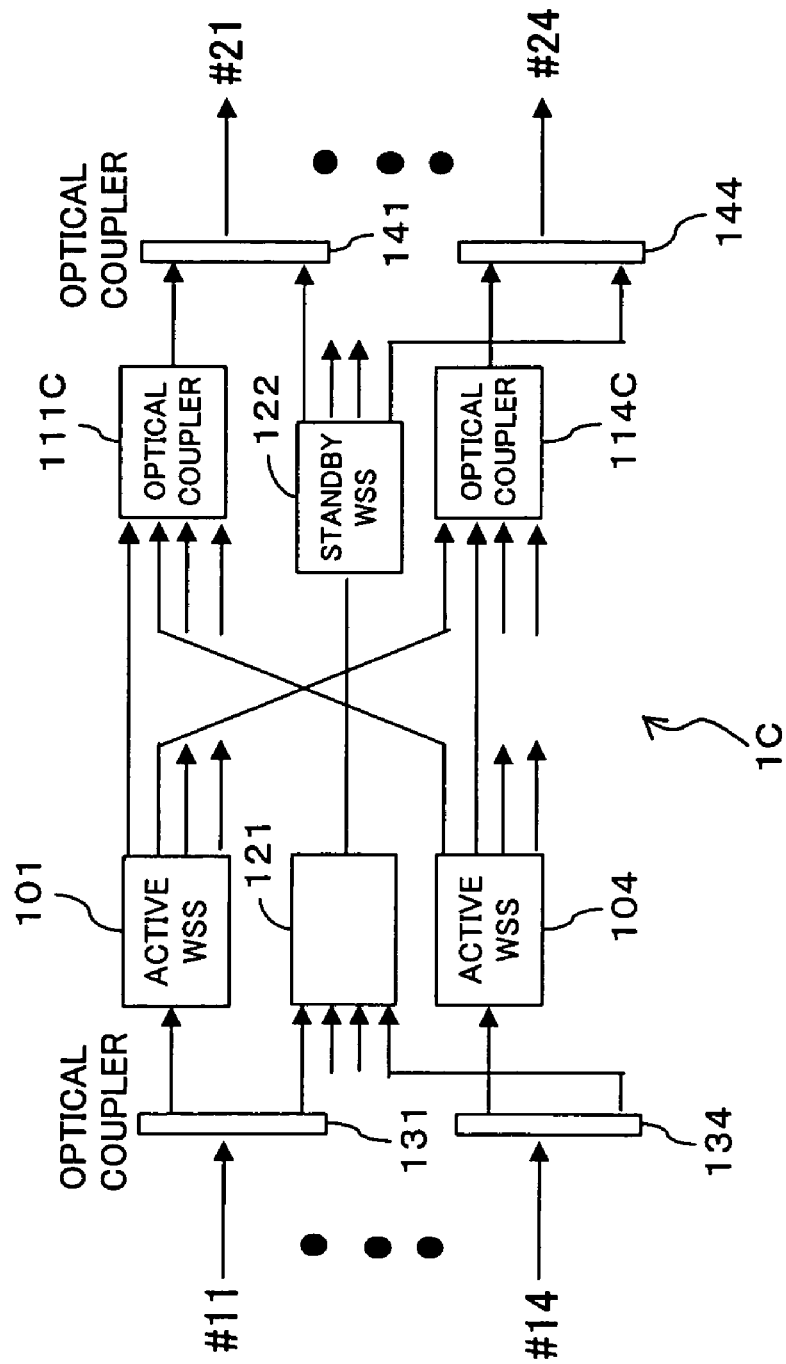
FIG. 13 is a diagrammatic view showing a third modification to the first embodiment of the present invention.

FIG. 13 shows a optical cross connect apparatus 1C according to a third modification to the first embodiment of the present invention. In the optical cross connect apparatus 1C shown in FIG. 13, different from the first embodiment described hereinabove, a plural number of 4×1 optical couplers 111C to 114C, equal to the number of output ports, as downstream side optical devices which multiplex output optical signals from the upstream side wavelength selective switches 101 to 104 and introduce the multiplexed optical signals to the output ports #21 to #24 are provided as upstream side optical devices.

In particular, the upstream side wavelength selective switches 101 to 104 change over the output routes of optical signals such that wavelength components to be introduced to the input ports #11 to #14 may be outputted to the corresponding ones of the optical couplers 111C to 114C, and the optical couplers 111C to 114C multiplex optical signals from the upstream side wavelength selective switches 101 to 104 and introduce the multiplexed optical signals to the output ports #21 to #24 to implement an optical cross connect function.

Then, the standby wavelength selective switches 121 and 122 can set a route for the optical cross connect as a standby system for common use for optical signals of the wavelengths selected for the output routes by the upstream side wavelength selective switches 101 to 104.

Also in the optical cross connect apparatus 1C having such a configuration as described above, advantages similar to those in the case of the first embodiment described hereinabove can be achieved by the standby wavelength selective switches 121 and 122.

A5. Fourth Modification to the First Embodiment

Figures 14A, 14B:
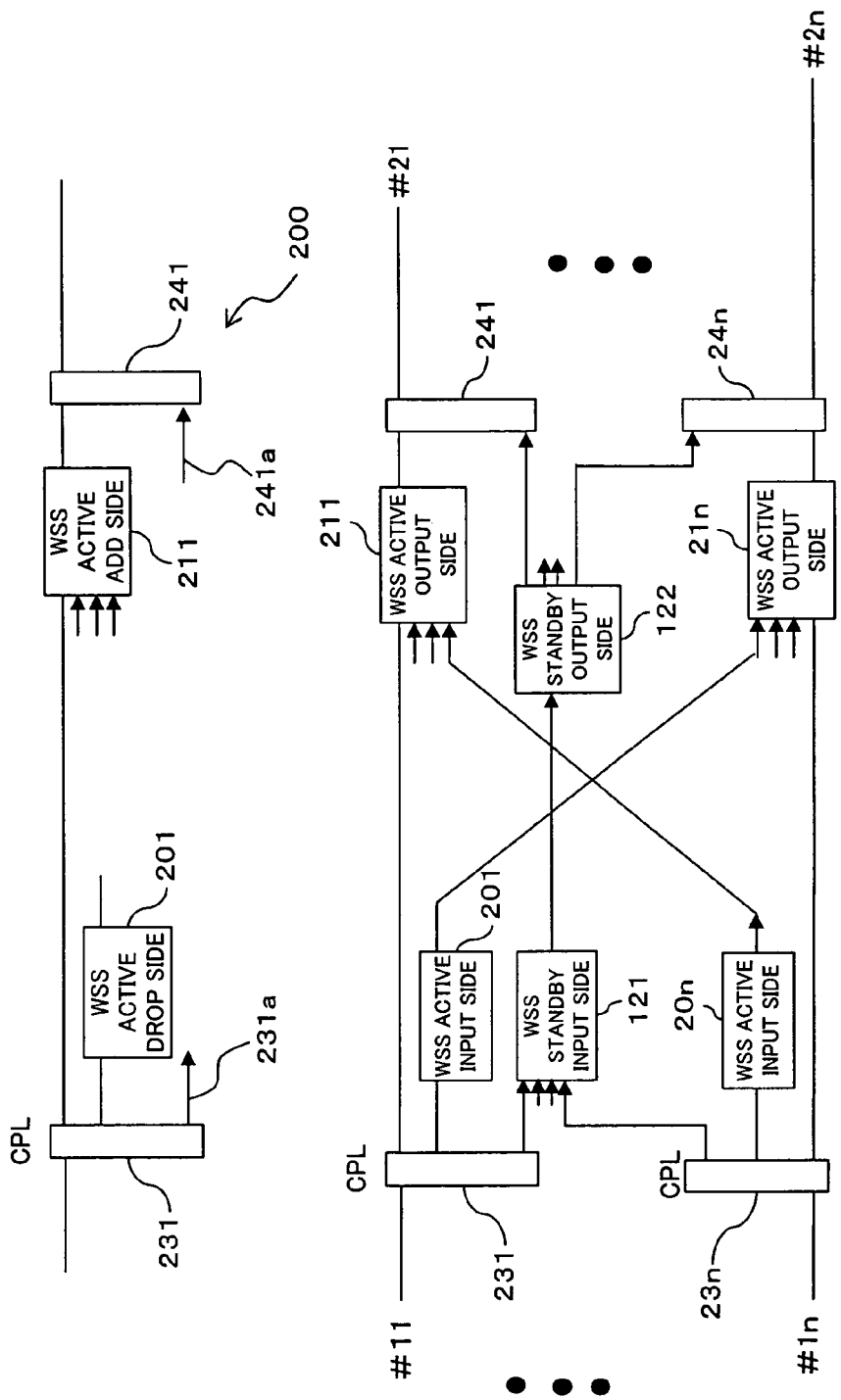
FIGS. 14(a) and 14(b) are diagrammatic views illustrating a fourth modification to the first embodiment of the present invention.

The optical cross connect apparatus 1 according to the first embodiment described above can be implemented, for example, by provision of a plurality of OADM (Optical Add Drop Multiplexer) apparatus 200 as shown in FIG. 14(a) and the standby wavelength selective switches 121 and 122.

In particular, each of the OADM apparatus 200 includes a branching coupler 231, a wavelength selective switch 201 for dropping one of branched lights from the branching coupler 231, an adding wavelength selective switch 211 for adding an optical signal to the other branched light from the branching coupler 231, and a multiplexing coupler 241. Each of the branching coupler 231 and the multiplexing coupler 241 includes a redundant port 231a or 241a.

Further, referring to FIG. 14(b), the optical cross connect apparatus 1 includes a plurality of (for example, n) OADM apparatus 200 having such a configuration as just described. Further, a standby wavelength selective switch 121 is connected to the redundant ports 231a of the branching couplers 231 to 23n which form the OADM apparatus 200, and outputs of the standby wavelength selective switch 122 connected in series to the standby wavelength selective switch 121 are connected to multiplexing couplers 241 to 24n, which form the OADM apparatus 200, through redundant ports 241a.

Then, dropping wavelength selective switches 201 to 20n and adding wavelength selective switches 211 to 21n which form the OADM apparatus 200 are connected similarly to the wavelength selective switches 101 to 104 and 111 to 114 in the first embodiment, by which the optical cross connect apparatus 1 can be upgraded to a hub node. Further, a redundant configuration for common use similar to that in the case of the first embodiment can be provided by the standby wavelength selective switches 121 and 122.

B. Second Embodiment

Figure 15:
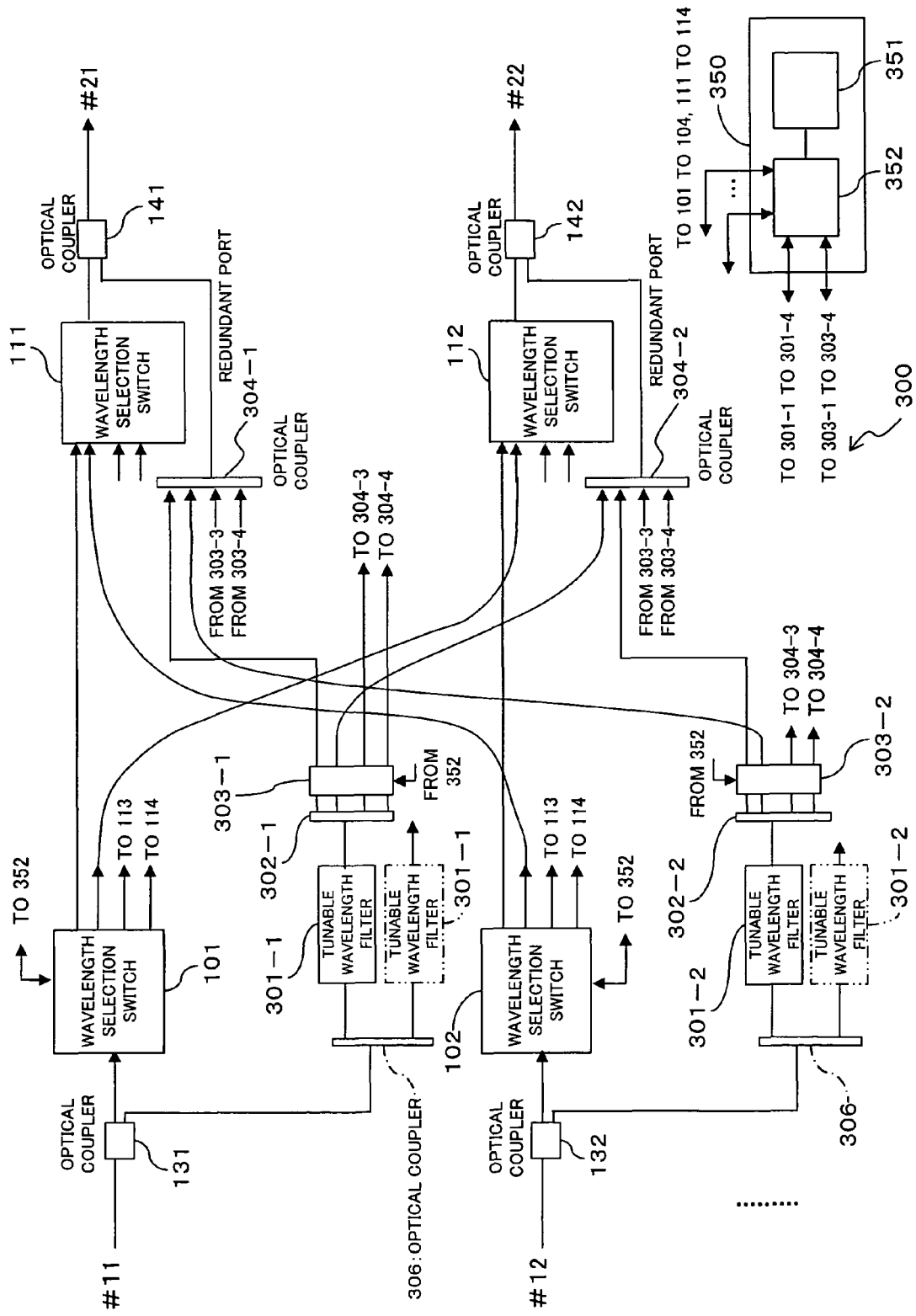
FIG. 15 is a diagrammatic view showing an optical cross connect apparatus according to a second embodiment of the present invention.

FIG. 15 shows an optical cross connect apparatus 300 according to a second embodiment of the present invention. While the optical cross connect apparatus 300 shown in FIG. 15 includes wavelength selective switches 101 to 104 and 111 to 114 and optical couplers 131 to 134 and 141 to 144 similar to those in the first embodiment described above, the configuration for setting of a standby route for the optical cross connect is different from that in the first embodiment described hereinabove.

In particular, in the optical cross connect apparatus 300 according to the second embodiment, tunable wavelength filters 301-1 to 301-4, optical couplers 302-1 to 302-4 and continuity/discontinuity gates 303-1 to 303-4 are provided individually in order to set standby routes for the optical cross connect of optical signals from input ports #11 to #14. It is to be noted that, in FIG. 15, only components corresponding to the input ports #11 and #12 and the output ports #21 and #22 are shown.

The tunable wavelength filter 301-1 is provided to set a standby route for the optical cross connect of an optical signal from the input port #11. More particularly, the tunable wavelength filter 301-1 receives a WDM optical signal from the input port #11 and passes a selected wavelength component of the WDM optical signal therethrough. Specifically, when an anomaly such as a fault occurs with any of wavelength paths set from the input port #11 through the wavelength selective switches 101 and 111 to 114, the tunable wavelength filter 301-1 can pass therethrough a wavelength component with which the fault occurs.

The optical coupler 302-1 branches optical signals of wavelength components passing through the tunable wavelength filter 301-1 toward the output ports. The continuity/discontinuity gate 303-1 performs a gating process (continuity or discontinuity) for the optical signal branched by the optical coupler 302-1 to the output ports #21 to #24.

For example, if wavelength paths connecting to the output ports #21 and #22 are set to an optical signal of a wavelength with which a fault occurs from within a WDM optical signal from the input port #11, then branched light is introduced only to the output ports #21 and #22 while branched light to the output ports #23 and #24 is interrupted.

Further, an OXC controller 350 includes a wavelength path table 351 and a setting changing section 352 similarly as in the case of the first embodiment described hereinabove. If the setting changing section 352 receives an alarm representing occurrence of an anomaly such as a fault with a wavelength channel component being used from any of the wavelength selective switches 101 to 104 and 111 to 114, it can control the tunable wavelength filters 301-1 to 301-4 and the continuity/discontinuity gates 303-1 to 303-4 from the input ports #11 to #14 relating to wavelength paths for the wavelength with which the fault occurs to repair the wavelength paths set for the wavelength with which the fault occurs.

It is to be noted that the optical couplers 304-1 to 304-4 are provided corresponding to the output ports #21 to #24, and receive branched light from the optical couplers 302-1 to 302-4 serving as branching devices through the corresponding continuity/discontinuity gates 303-1 to 303-4, multiplex the received light and output the multiplexed light to the corresponding output ports #21 to #24 through the optical couplers 141 to 144.

The configuration for setting of a standby route provided for each of the input ports #11 to #14 described above (refer to reference numerals 301-1 to 301-4, 302-1 to 302-4 and 303-1 to 303-4) may be formed as a multiple configuration for each of the input ports #11 to #14 by interposing a branching optical coupler 306 at a stage next to the optical couplers 131 to 134.

By the configuration just described, multiple faults can be coped with because the number of wavelengths with regard to which a fault can be repaired through the tunable wavelength filters 301-1 to 301-4 can be increased in accordance with the number of multiples (for example, if a dual configuration is used, then a fault on two different wavelengths can be repaired).

According to the configuration described above, also in the optical cross connect apparatus 300 according to the second embodiment of the present invention, an optical cross connect process can be performed similarly as in the case of the first embodiment described hereinabove. Thus, if a fault occurs with any of wavelength paths set by the wavelength selective switches 101 to 104 and 111 to 114, the wavelength path for the wavelength with which the fault occurs can be repaired by the tunable wavelength filters 301-1 to 301-4 and the continuity/discontinuity gates 303-1 to 303-4.

In regular operation, the tunable wavelength filters 301-1 to 301-4 do not operate and do not pass optical signals therethrough. However, if a changeover fault in the wavelength selective switches 101 to 104 and 111 to 114 which are active is detected by the internal monitor mechanism (refer to reference character 100h of FIG. 2), then the OXC controller 350 turns off the changeover wavelength by the wavelength selective switches 101 to 104 and 111 to 114 of the changeover output destination or the changeover input source so that the influence of the fault may be suppressed similarly as in the case of the first embodiment.

Figure 16:
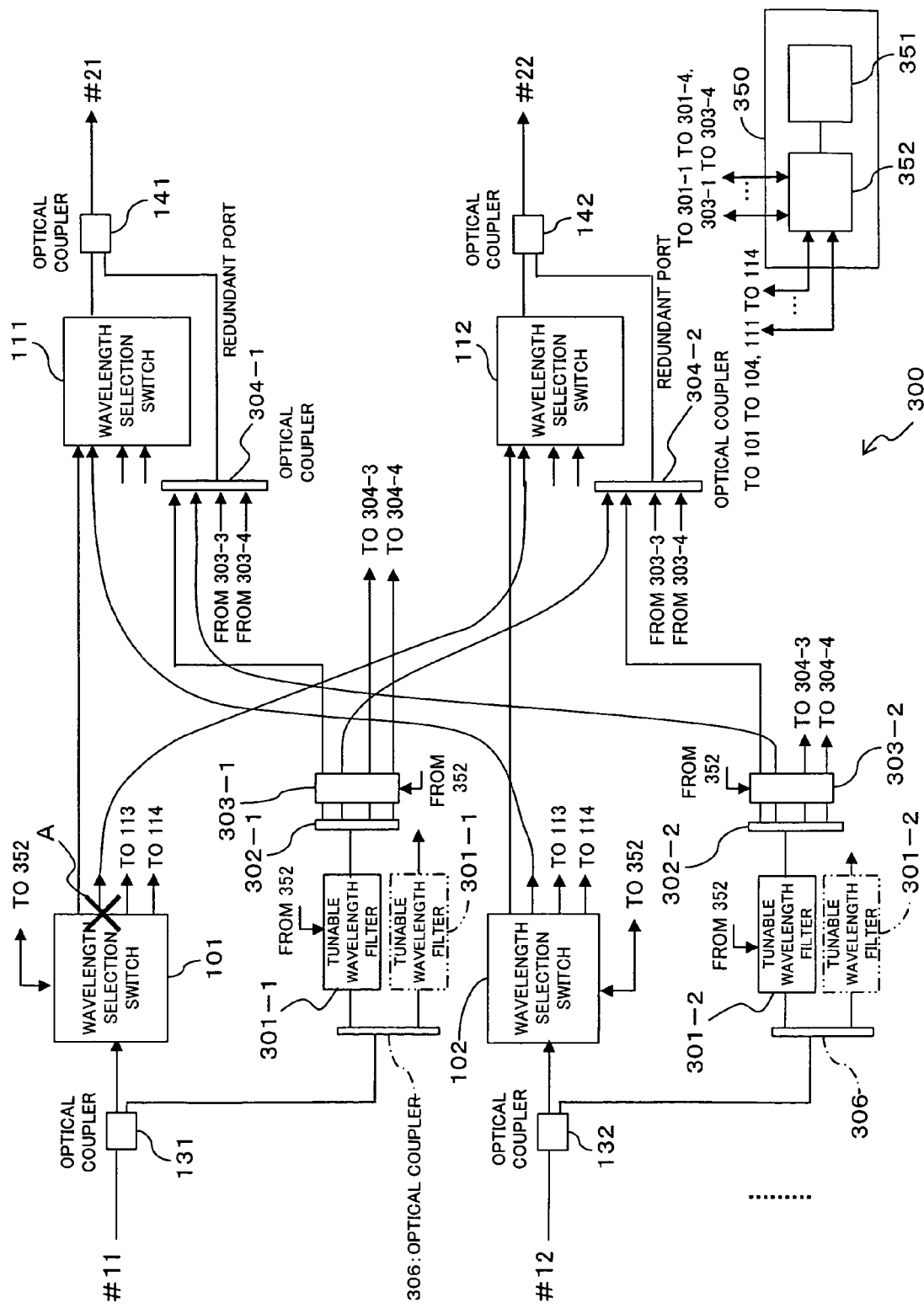
FIGS. 16 and 17 are views illustrating operation of the optical cross connect apparatus of the second embodiment of the present invention.

Then, wavelength changeover in the standby path is performed by wavelength selection by the tunable wavelength filters 301-1 to 301-4. In particular, such wavelength changeover when, where wavelength paths of the wavelengths $\lambda 1$ and $\lambda 2$ are set from the input port #11 to the output port #22, a fault occurs with the wavelength path for the wavelength path $\lambda 2$ (refer to A of FIG. 16) is described.

If a fault occurs with the wavelength path for the wavelength path $\lambda 2$ described above, then the wavelength selective switch 101 detects this and outputs an alarm for notification of occurrence of a fault with the wavelength path $\lambda 2$ to the OXC controller 350. The OXC controller 350 controls the tunable wavelength filter 301-1 to pass the optical signal of the wavelength $\lambda 2$ therethrough and controls the continuity/discontinuity gate 303-1 to output the optical signal of the wavelength path $\lambda 2$ to the optical coupler 304-2 connecting to the output port #22. On the other hand, optical signals of the wavelength path $\lambda 2$ to the other output ports #21, #23 and #24 are interrupted by the continuity/discontinuity gate 303-1.

Figure 17:
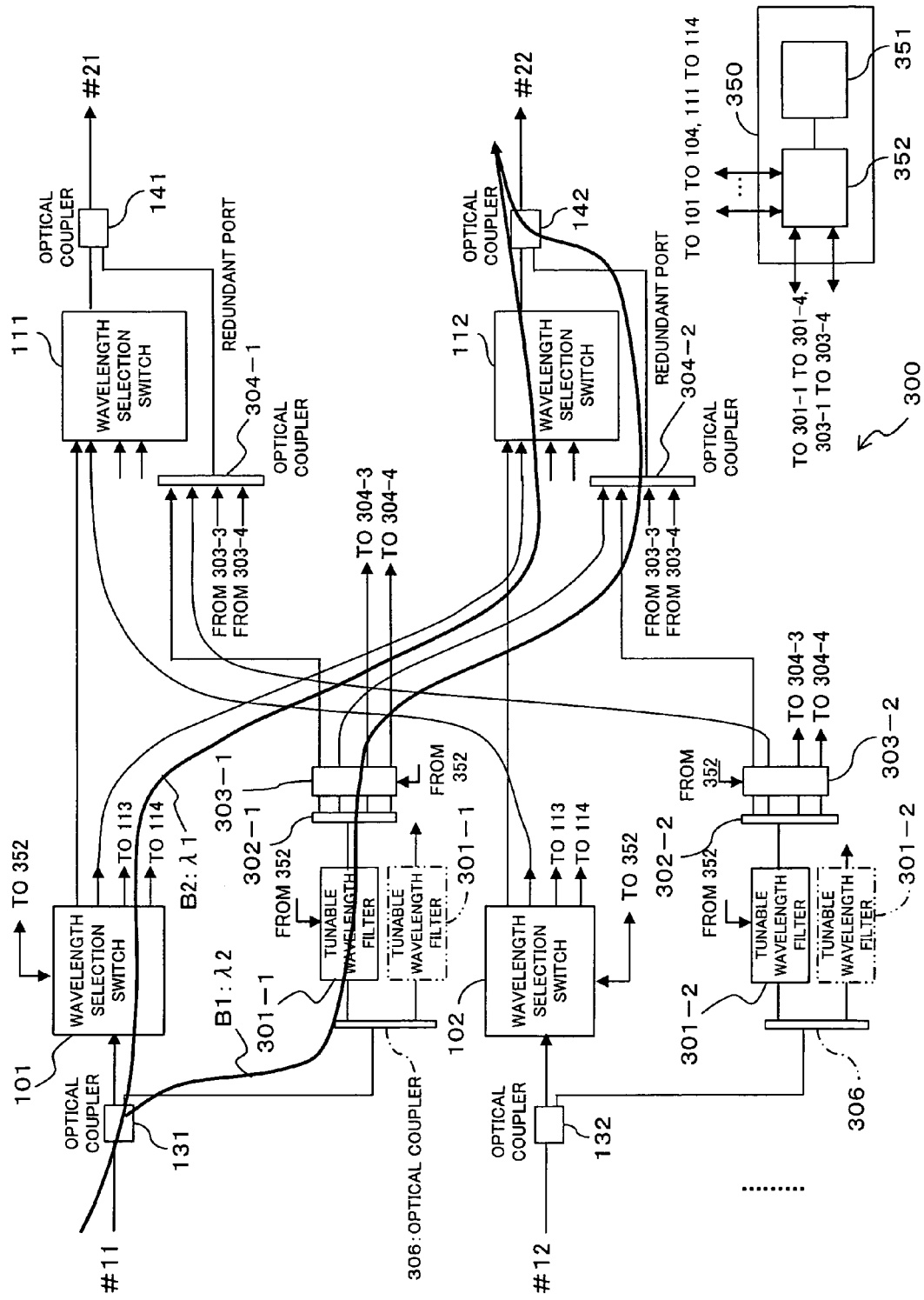

Consequently, the wavelength paths of the wavelength path $\lambda 2$ with which the fault occurs can be repaired through the optical coupler 306, tunable wavelength filter 301-1, optical coupler 302-1, continuity/discontinuity gate 303-1 and optical coupler 304-2 (refer to B1 of FIG. 17).

In this instance, the repair of the wavelength paths does not have an influence on communication by the other wavelength paths. In particular, any other wavelength path connected between the input port #11 and the output port #22, that is, the wavelength path for the wavelength $\lambda 1$ with which no fault occurs, can remain set as it is through the wavelength selective switches 101 and 112 (refer to B2 of FIG. 17).

It is to be noted that, in the optical cross connect apparatus 300 according to the second embodiment, when any of the wavelength selective switches 101 to 104 and 111 to 114 with which a fault occurs is to be replaced, the replacing operation is performed after the service of all wavelengths which pass the wavelength selective switches 101 to 104 and 111 to 114 which relate to the occurring fault is stopped once or is bypassed to a route provided redundantly by a higher hierarchy protocol.

In this manner, with the optical cross connect apparatus 300 according to the second embodiment of the present invention, since it includes the tunable wavelength filters 301-1 to 301-4, optical couplers 302-1 to 302-4 and continuity/discontinuity gates 303-1 to 303-4, a redundant configuration which is simplified from that shown in FIG. 10 can be implemented. Consequently, there is an advantage that the number of wavelength selective switches provided in the standby system can be reduced significantly and miniaturization of the apparatus can be anticipated and besides the power consumption can be reduced.

The optical cross connect apparatus according to the second embodiment of the present invention is advantageous also in that it eliminates the influence on the other connections which operate regularly when a wavelength selective switch is replaced and wavelength path resources of the standby system can be utilized effectively.

It is to be noted that, while, in the description of the second embodiment, the four-input four-output (4×4) optical cross connect apparatus 1 is described, the present invention is not limited to this but can be applied to an N×M cross connect apparatus having a different number of (N) input ports and a different number of (M) output ports. In this instance, a number of sets of a tunable wavelength filter, a branching coupler and a continuity/discontinuity gate corresponding to the number of input ports are provided and the number of branches of the branching coupler is suitably changed in accordance with the number of output ports.

C. Others

The present invention is not limited to the embodiments specifically described above, and variations and modifications can be made without departing from the scope of the present invention.

Further, it is possible to fabricate the apparatus of the present invention based on the disclosure of the embodiments described above.

What is claimed is:

1. An optical apparatus, comprising:
   a plurality of input ports;
   a plurality of output ports;
   a plurality of upstream side optical devices provided corresponding to said input ports;
   a plurality of downstream side optical devices provided corresponding to said output ports;
   each of said plural upstream side optical devices having an input connected to a corresponding one of said input ports and a plurality of outputs individually connected to said plural downstream side optical devices;
   each of said downstream side optical devices having a plurality of inputs individually connected to the outputs of said upstream side optical devices and an output connected to a corresponding one of said output ports;
   said upstream side optical devices and said down-stream side optical devices being configured so as to be capable of changing over said output ports which are to be determined as output destinations of lights from said input ports for each of wavelengths;
   an upstream side standby switch having a plurality of inputs individually connected to said input ports and capable of changing over an output of the lights from said inputs for each of the wavelengths;
   a downstream side standby switch having an input connected to the output of said upstream side standby switch and a plurality of outputs individually connected to said output ports and capable of outputting the light from the input to said outputs for each of the wavelengths; and
   a controller to perform changeover control between a path between said input ports and said output ports for each of the optical wavelengths set by said upstream side optical devices and said downstream optical devices and another path set by said upstream side standby switch and said downstream side standby switch;
   wherein each of said upstream side optical devices is formed as an upstream side optical switch capable of selectively outputting the light from the input to said outputs for each of the wavelengths;
   said optical apparatus further comprises:
   a plurality of input port side optical couplers individually corresponding to said input ports each for branching a wavelength division multiplexed signal inputted from the corresponding input port into two signals and for outputting one of the branched signals to the upstream side optical device corresponding to the input port and outputting the other one of the branched signals to the upstream side standby switch; and
   a plurality of output port side optical couplers individually corresponding to said output ports each for multiplexing an output wavelength multiplexing optical signal outputted from the corresponding downstream side optical device and an optical signal from said downstream side standby switch; and
   said controller includes:
   a wavelength path table to store, for each of wavelengths used to form the wavelength multiplexing optical signals, a relationship between said input ports and said output ports between which a wavelength path is to be set; and
   a setting changing section to change a changeover setting between said upstream side optical devices and downstream side optical devices and between said upstream side standby switch and said downstream side standby switch based on contents of said wavelength path table.

2. The optical apparatus as claimed in claim 1, wherein each of said downstream side optical devices is formed as a downstream side optical switch capable of selectively outputting the lights from said upstream side optical devices for each of the wavelengths.

3. The optical apparatus as claimed in claim 1, wherein, when a fault occurs with the connection of a first upstream side optical device which is one of said upstream side optical devices to a first downstream side optical device which is one of said downstream side optical devices, said upstream side standby switch outputs the light inputted from the input port which corresponds to the first upstream side optical device and having a wavelength of the light which is to be outputted from the first upstream side optical device to the first downstream side optical device, and said downstream side standby switch outputs the light inputted thereto to the output port which corresponds to the first downstream side optical device.

4. The optical apparatus as claimed in claim 1, wherein, when a fault occurs with the output of a first wavelength from a first upstream side optical device which is one of said upstream side optical devices, said upstream side standby switch outputs the light of the first wavelength inputted from the input port corresponding to the first upstream side optical device, and said downstream side standby switch outputs the light inputted thereto to the output port which corresponds to the downstream side optical device to which the light of the first wavelength is to be outputted from the first upstream side optical device.

5. The optical apparatus as claimed in claim 1, wherein, where each of N and M represents an integer, each of said upstream side optical devices is formed from a 1×N wavelength selective switch and the number of said upstream side optical devices provided is M, and each of said downstream side optical devices is formed from an M×1 wavelength selective switch and the number of said downstream side optical devices provided is N.

6. The optical apparatus as claimed in claim 1, wherein, where each of N and M represents an integer, each of said upstream side optical devices is formed from a 1×N wavelength selective switch and the number of said upstream side optical devices provided is M, and each of said downstream side optical devices is formed from an M×1 optical coupler and the number of said downstream side optical devices provided is N.

7. The optical apparatus as claimed in claim 1, wherein, where each of N and M represents an integer, each of said upstream side optical devices is formed from a 1×N wavelength selective switch and the number of said upstream side optical devices provided is M, and each of said downstream side optical devices is formed from an M×1 optical coupler and the number of said downstream side optical devices provided is N.

8. The optical apparatus as claimed in claim 1, wherein, where each of N and M represents an integer, each of said upstream side optical devices is formed from a 1×N optical coupler and the number of said upstream side optical devices provided is M, and each of said downstream side optical devices is formed from an M×1 wavelength selective switch and the number of said downstream side optical devices provided is N.

9. The optical apparatus as claimed in claim 2, wherein, where each of N and M represents an integer, each of said upstream side optical devices is formed from a 1×N optical coupler and the number of said upstream side optical devices provided is M, and each of said downstream side optical devices is formed from an M×1 wavelength selective switch and the number of said downstream side optical devices provided is N.

10. The optical apparatus as claimed in claim 1, further comprising a control section for performing changeover control between a path between said input ports and said output ports for each of the optical wavelengths set by said upstream side optical devices and said downstream optical devices and another path set by said upstream side standby switch and said downstream side standby switch.

11. The optical apparatus as claimed in claim 10, wherein said control section includes:
  a wavelength path table for storing, for each of wavelengths used to form the wavelength multiplexing optical signals, a relationship between said input ports and said output ports between which a wavelength path is to be set; and
  a setting changing section for changing a changeover setting between said upstream side optical devices and downstream side optical devices and between said upstream side standby switch and said downstream side standby switch based on contents of said wavelength path table.

12. The optical apparatus as claimed in claim 11, wherein said setting changing section leaves a first wavelength path not suffering from a fault of wavelength paths between the upstream side optical device and the downstream side optical device without changing over the first path to the paths set by the upstream side standby switch and the downstream side standby switch, the wavelength paths between the upstream side optical device and the downstream side optical device including a second wavelength path suffering from a fault;
  meanwhile said setting changing section changes over the second wavelength path to a path set by the upstream side standby switch and the downstream side standby switch.

13. An optical cross connect apparatus for optically cross connecting a plurality of input ports and a plurality of output ports, comprising:
  a plurality of upstream side wavelength selective switches provided corresponding to said input ports for outputting input wavelength division multiplexed signals from said input ports from output routes changed over for each of wavelengths;
  a plurality of downstream side wavelength selective optical switches provided corresponding to said output ports for receiving, at inputs thereof, the optical signals outputted from the output routes of said upstream side wavelength selective switches, selecting the optical signals to be introduced to said output ports from among the inputted optical signals for each of the wavelengths and outputting the selected wavelength division multiplexed signals;
  a plurality of tunable wavelength filters individually corresponding to said input ports for receiving the input wavelength division multiplexed signals from said input ports as inputs thereto and passing selected wavelength components of the input wavelength division multiplexed optical signals therethrough;
  a plurality of branching devices individually corresponding to said input ports for branching the optical signals of the wavelength components having passed through said tunable wavelength filters toward said output ports;
  a plurality of continuity/discontinuity gates individually corresponding to said input ports for continuing or discontinuing the optical signals branched by said branching devices to said output ports; and
  a control section for performing changeover control between a path between said input ports and said output ports for each of the optical wavelengths set by said upstream side optical devices and said downstream optical devices and another path set by said upstream side standby switch and said downstream side standby switch, wherein said control section comprises:
  a wavelength path table for storing, for each of wavelengths used to form the wavelength multiplexing optical signals, a relationship between said input ports and said output ports between which a wavelength path is to be set; and
  a setting changing section for changing a changeover setting between said upstream side optical devices and downstream side optical devices and between said upstream side standby switch and said downstream side standby switch based on contents of said wavelength path table.

14. A method of optically cross connecting a plurality of input ports and a plurality of output ports, comprising:
  providing a plurality of input ports;
  providing a plurality of output ports;
  providing a plurality of upstream side optical devices corresponding to the input ports;
  providing a plurality of downstream side optical devices corresponding to the output ports;
  connecting an input of each of the plural upstream side optical devices to a corresponding one of the input ports;
  connecting a plurality of outputs of each of the plural upstream side optical devices individually to the plural downstream side optical devices;
  connecting a plurality of inputs of each of the downstream side optical devices having individually to the outputs of the upstream side optical devices;
  connecting an output of each of the downstream side optical devices to a corresponding one of the output ports;
  changing over the output ports of the upstream side optical devices and the downstream side optical devices which are to be determined as output destinations of lights from the input ports for each of wavelengths;
  connecting a plurality of inputs of an upstream side standby switch individually to the input ports;
  changing over an output of the lights from the inputs of the upstream side standby switch for each of the wavelengths;
  connecting an input of a downstream side standby switch to the output of the upstream side standby switch;
  connecting a plurality of outputs of the downstream side standby switch individually to the output ports;

outputting the light from the input of the downstream side standby switch to the outputs for each of the wavelengths;

changing between a path between the input ports and the output ports for each of the optical wavelengths set by the upstream side optical devices and the downstream side optical devices and another path set by the upstream side standby switch and the downstream side standby switch;

providing a plurality of input port side optical couplers individually corresponding to the input ports;

branching a wavelength division multiplexed signal inputted from a corresponding input port into two signals;

outputting one of the branched signals to the upstream side optical device corresponding to the input port;

outputting the other one of the branched signals to the upstream side standby switch;

forming each of the upstream side optical devices as an upstream side optical switch capable of selectively outputting the light from the input to said outputs for each of the wavelengths;

providing a plurality of output port side optical couplers individually corresponding to the output ports; and multiplexing an output wavelength multiplexing optical signal outputted from the corresponding downstream side optical device and an optical signal from the downstream side standby switch;

storing a relationship between the input ports and the output ports between which a wavelength path is to be set for each of the wavelengths used to form the wavelength multiplexing optical signals in a wavelength path table; and changing between the path between the input ports and the output ports for each of the optical wavelengths set by the upstream side optical devices and the downstream side optical devices and the another path set by the upstream side standby switch and the downstream side standby switch based on contents of the wavelength path table.

* * * * *

UNITED STATES PATENT AND TRADEMARK OFFICE
CERTIFICATE OF CORRECTION

PATENT NO. : 7,764,881 B2
APPLICATION NO. : 11/320960
DATED : July 27, 2010
INVENTOR(S) : Yasuhiko Aoki It is certified that error appears in the above-identified patent and that said Letters Patent is hereby corrected as shown below:

Column 24, Line 50 after "devices" delete "having".

Signed and Sealed this
Fourth Day of January, 2011

David J. Kappos
*Director of the United States Patent and Trademark Office*